US010379329B2

(12) United States Patent
Ue

(10) Patent No.: US 10,379,329 B2
(45) Date of Patent: Aug. 13, 2019

(54) MICROSCOPE SYSTEM AND SETTING VALUE CALCULATION METHOD

(71) Applicant: OLYMPUS CORPORATION, Shibuya-ku, Tokyo (JP)

(72) Inventor: Yoshihiro Ue, Hidaka (JP)

(73) Assignee: OLYMPUS CORPORATION, Tokyo (JP)

( * ) Notice: Subject to any disclaimer, the term of this patent is extended or adjusted under 35 U.S.C. 154(b) by 415 days.

(21) Appl. No.: 14/964,306

(22) Filed: Dec. 9, 2015

(65) Prior Publication Data

US 2016/0170193 A1 Jun. 16, 2016

(30) Foreign Application Priority Data

Dec. 15, 2014 (JP) ................. 2014-253526
Dec. 15, 2014 (JP) ................. 2014-253527
Dec. 15, 2014 (JP) ................. 2014-253528

(51) Int. Cl.
*G02B 27/00* (2006.01)
*G02B 21/00* (2006.01)
(Continued)

(52) U.S. Cl.
CPC ....... *G02B 21/0072* (2013.01); *G02B 21/008* (2013.01); *G02B 21/0032* (2013.01);
(Continued)

(58) Field of Classification Search
None
See application file for complete search history.

(56) References Cited

U.S. PATENT DOCUMENTS 5,270,860 A 12/1993 Suzuki
6,525,875 B1 2/2003 Lauer
(Continued)

FOREIGN PATENT DOCUMENTS

EP 2770360 A2 8/2014
EP 3035104 A2 6/2016
(Continued)

OTHER PUBLICATIONS

Extended European Search Report dated Jun. 20, 2016, issued in counterpart European Application No. 15198629.6.
(Continued)

*Primary Examiner* — Derek S. Chapel
(74) *Attorney, Agent, or Firm* — Holtz, Holtz & Volek PC

(57) ABSTRACT

A microscope system includes a microscope apparatus and a computing device. The microscope apparatus obtains image data of a surface to be observed of a sample in each of the plurality of states having different setting values of a correction collar. The computing device calculates an evaluation value of image data on the basis of each of the plural pieces of image data. A process in which the microscope apparatus obtains the plural pieces of image data is repeated in such a way that a distribution range and an average interval of the setting values are narrowed in each repetition, and that the setting value that corresponds to a maximum evaluation value is included within the distribution range. The computing device calculates the setting value for correcting a spherical aberration on the basis of the evaluation values and the setting values that correspond to the evaluation values.

17 Claims, 32 Drawing Sheets

(51) Int. Cl.
*G02B 21/24* (2006.01)
*G02B 21/36* (2006.01)

(52) U.S. Cl.
CPC ......... *G02B 21/248* (2013.01); *G02B 21/367* (2013.01); *G02B 27/0025* (2013.01); *G02B 27/0068* (2013.01)

(56) References Cited

U.S. PATENT DOCUMENTS

| | | | |
|---|---|---|---|
| 6,563,634 B2 | 5/2003 | Shimada et al. | |
| 6,751,016 B2 | 6/2004 | Fukuyama et al. | |
| 6,836,373 B2 | 12/2004 | Hosokawa | |
| 6,924,929 B2 | 8/2005 | Yasuda et al. | |
| 7,002,736 B2 | 2/2006 | Fukuyama et al. | |
| 7,054,071 B2 | 5/2006 | Davidson | |
| 7,142,484 B2 | 11/2006 | Ando et al. | |
| 7,224,523 B2 | 5/2007 | Fukuyama et al. | |
| 7,224,645 B2 | 5/2007 | Ando et al. | |
| 7,349,152 B2 | 3/2008 | Kei | |
| 7,649,682 B2 | 1/2010 | Olschewski | |
| 7,903,329 B2 | 3/2011 | Yoshida et al. | |
| 8,400,709 B2 | 3/2013 | Yoshida et al. | |
| 8,786,945 B2 | 7/2014 | Yoshida et al. | |
| 9,261,458 B2 | 2/2016 | Tamano | |
| 9,312,094 B2 | 4/2016 | Akima et al. | |
| 9,411,142 B2 * | 8/2016 | Ue | G02B 21/008 |
| 9,645,373 B2 | 5/2017 | Yoshida et al. | |
| 2002/0036823 A1 | 3/2002 | Shimada et al. | |
| 2003/0029999 A1 | 2/2003 | Hosokawa | |
| 2003/0063379 A1 | 4/2003 | Fukuyama et al. | |
| 2003/0184855 A1 | 10/2003 | Yasuda et al. | |
| 2004/0201885 A1 | 10/2004 | Fukuyama et al. | |
| 2005/0002285 A1 | 1/2005 | Ando et al. | |
| 2005/0024718 A1 | 2/2005 | Sase et al. | |
| 2005/0046930 A1 | 3/2005 | Olschewski | |
| 2005/0083517 A1 | 4/2005 | Asad et al. | |
| 2005/0213204 A1 | 9/2005 | Kei | |
| 2006/0007534 A1 | 1/2006 | Fukuyama et al. | |
| 2006/0007557 A1 | 1/2006 | Davidson | |
| 2006/0098213 A1 | 5/2006 | Itoh et al. | |
| 2009/0231692 A1 | 9/2009 | Yoshida et al. | |
| 2010/0141752 A1 | 6/2010 | Yamada et al. | |
| 2010/0272334 A1 | 10/2010 | Yamada et al. | |
| 2011/0102572 A1 | 5/2011 | Kihara et al. | |
| 2011/0141260 A1 | 6/2011 | Ouchi et al. | |
| 2011/0141557 A1 | 6/2011 | Yoshida et al. | |
| 2011/0272578 A1 * | 11/2011 | Hirose | H01J 37/153 250/310 |
| 2013/0155500 A1 | 6/2013 | Yoshida et al. | |
| 2013/0229663 A1 | 9/2013 | Yang et al. | |
| 2014/0211307 A1 | 7/2014 | Yoshida et al. | |
| 2014/0231666 A1 | 8/2014 | Akima et al. | |
| 2014/0233094 A1 | 8/2014 | Ue et al. | |
| 2015/0003714 A1 | 1/2015 | McCarty et al. | |
| 2015/0015871 A1 | 1/2015 | Tamano | |
| 2015/0253562 A1 | 9/2015 | Kues et al. | |
| 2016/0170193 A1 | 6/2016 | Ue | |
| 2017/0017070 A1 * | 1/2017 | Suzuki | G02B 27/0068 |
| 2017/0017071 A1 | 1/2017 | Ue et al. | |
| 2017/0242229 A1 | 8/2017 | Yoshida et al. | |

FOREIGN PATENT DOCUMENTS

| | | | |
|---|---|---|---|
| JP | H05119263 A | 5/1993 | |
| JP | 2002169101 A | 6/2002 | |
| JP | 2003029151 A | 1/2003 | |
| JP | 2003029152 A | 1/2003 | |
| JP | 2004037581 A | 2/2004 | |
| JP | 2005031507 A | 2/2005 | |
| JP | 2005043624 A | 2/2005 | |
| JP | 2005275199 A | 10/2005 | |
| JP | 2006023476 A | 1/2006 | |
| JP | 2006251209 A | 9/2006 | |
| JP | 2006293219 A | 10/2006 | |
| JP | 2008164834 A | 7/2008 | |
| JP | 2011095685 A | 5/2011 | |
| JP | 2011191617 A | 9/2011 | |
| JP | 2012042525 A | 3/2012 | |
| JP | 2012145788 A | 8/2012 | |
| JP | 2013088138 A | 5/2013 | |
| JP | 2013160815 A | 8/2013 | |
| JP | 2014160213 A | 9/2014 | |
| JP | 2015018045 A | 1/2015 | |
| WO | 2005096062 A1 | 10/2005 | |
| WO | 2009096522 A1 | 8/2009 | |
| WO | 2009153919 A1 | 12/2009 | |

OTHER PUBLICATIONS

European Office Action dated Oct. 11, 2017 issued in counterpart European Application No. 15198629.6.
"Intro to Scientific Computing", Bindel, Spring 2012, Dec. 31, 2012 (Dec. 31, 2012), <http://www.cs.cornell.edu/~bindel/class/cs3220-s12/notes/lec21.pdf>.
Japanese Office Action dated Mar. 13, 2018 issued in counterpart Japanese Application No. 2014-253527.
Japanese Office Action dated Mar. 13, 2018 issued in counterpart Japanese Application No. 2014-253528.
Japanese Office Action dated Mar. 6, 2018 issued in counterpart Japanese Application No. 2014-253526.
Japanese Office Action dated Jan. 15, 2019 (and English translation thereof) issued in Japanese Application No. 2015-141965.
Japanese Office Action dated Jan. 22, 2019 (and English translation thereof) issued in Japanese Application No. 2015-141964.
Extended European Search Report dated Nov. 17, 2016, issued in European Application No. 16178657.9.
Extended European Search Report dated Nov. 30, 2017, issued in European Application No. 14154835.4.
Japanese Office Action dated Dec. 6, 2016 issued in Japanese Application No. 2013-031483.
Notice of Allowance dated Apr. 25, 2016 issued in U.S. Appl. No. 14/180,189.
Office Action (Non-Final Rejection) dated Mar. 8, 2018 issued in U.S. Appl. No. 15/205,028.
Office Action (Non-Final Rejection) dated May 18, 2018 issued in U.S. Appl. No. 15/205,039.
Office Action (Non-Final Rejection) dated Oct. 8, 2015 issued in U.S. Appl. No. 14/180,189.
Related U.S. Appl. No. 14/180,189; First Named Inventor: Yoshihiro Ue; Title: "Microscope System and Storage Medium"; filed Feb. 13, 2014.
Related U.S. Appl. No. 15/205,028; First Named Inventor: Shingo Suzuki; Title: "Microscopy System, Determination Method, and Recording Medium"; filed Jul. 8, 2016.
Related U.S. Appl. No. 15/205,039; First Named Inventor: Yoshihiro Ue; Title: "Microscopy System, Refractive-Index Calculating Method, and Recording Medium"; filed Jul. 8, 2016.
Brenner, et al., "An Automated Microscope for Cytologic Research a Preliminary Evaluation", The Journal of Histochemistry and Cytochemistry, 1976, vol. 24, No. 1, pp. 100-111.
Office Action (Final Rejection) dated Mar. 21, 2019 issued in related U.S. Appl. No. 15/205,039.

* cited by examiner

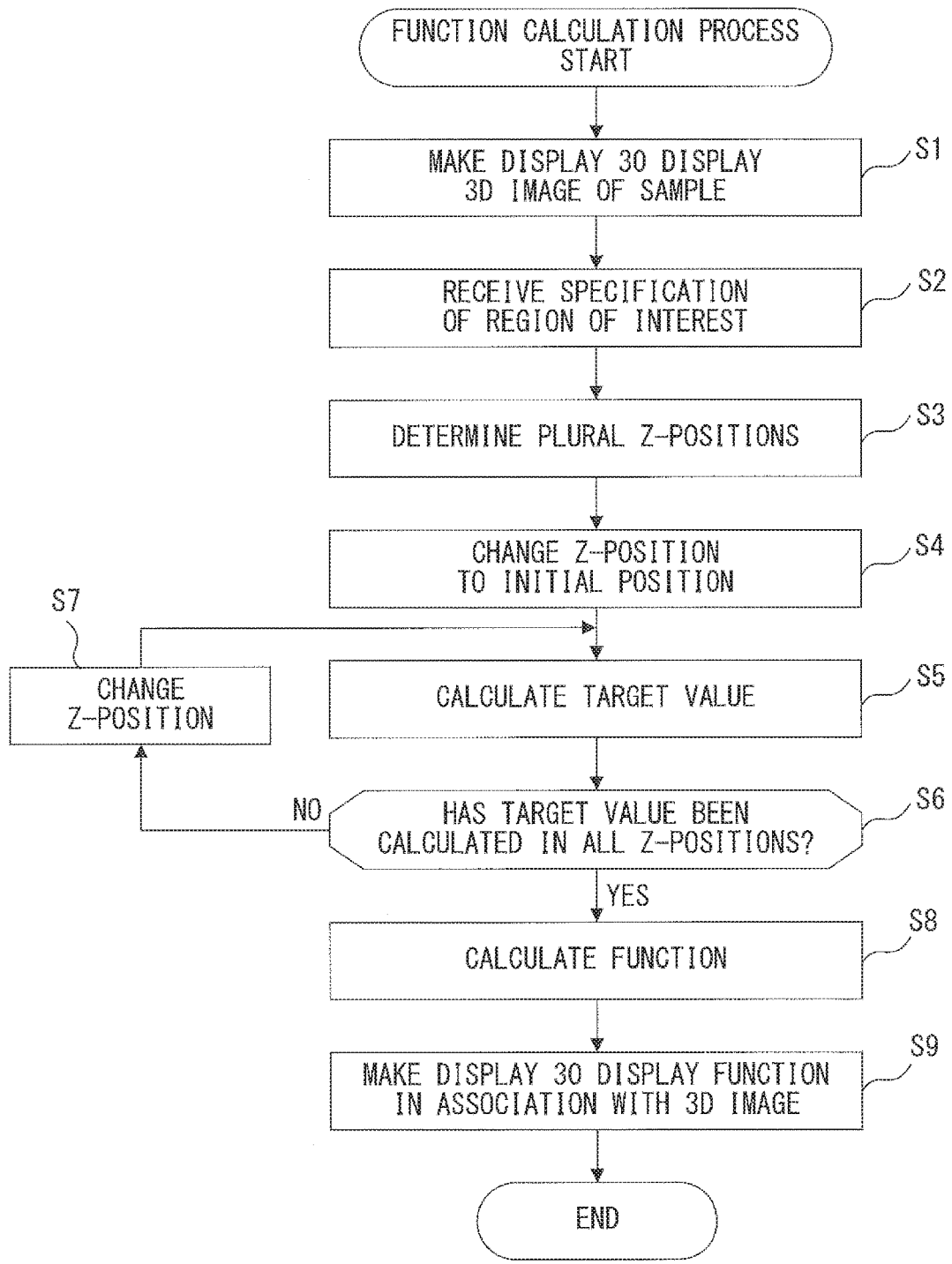
F I G. 4

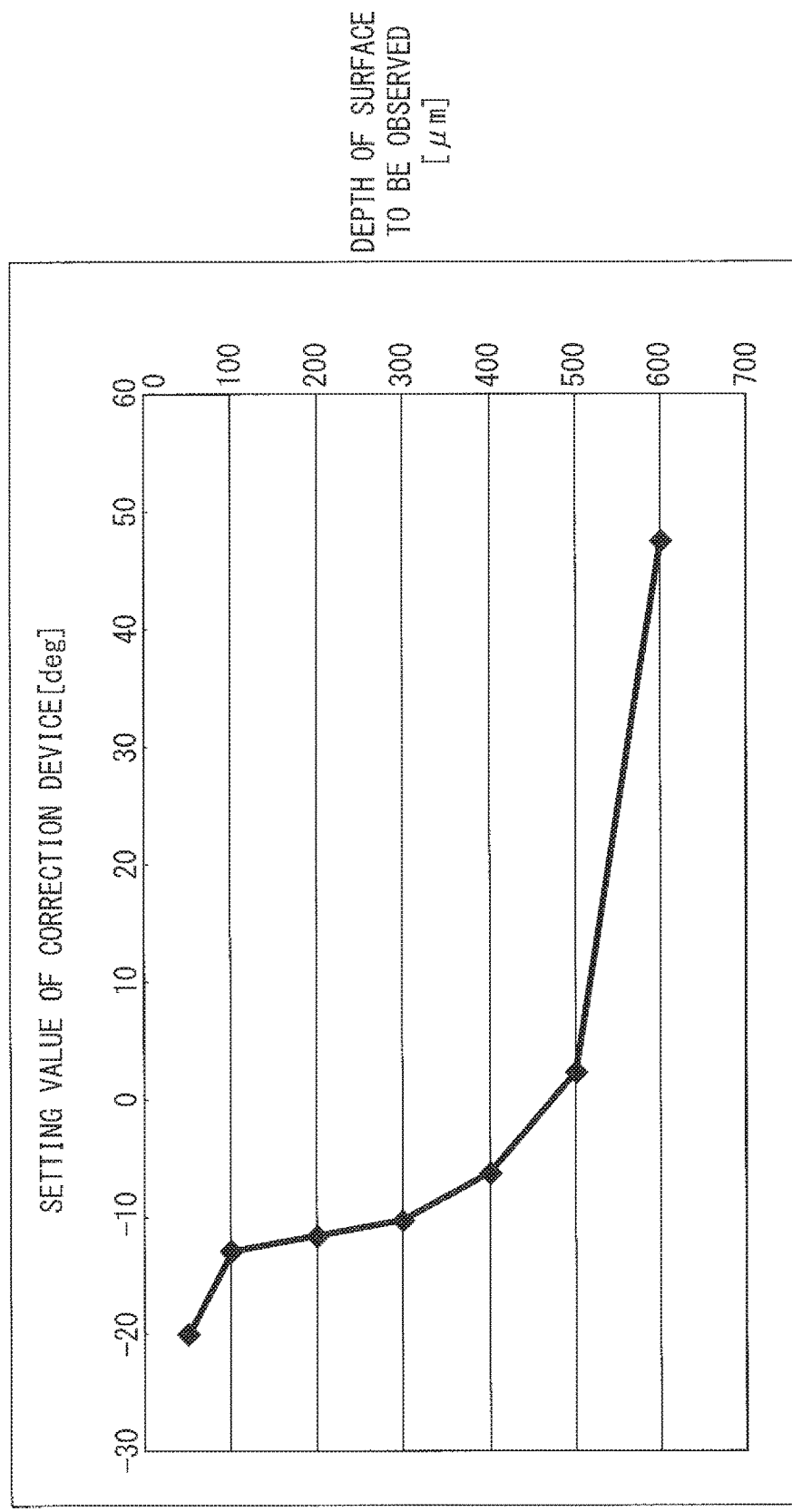
F I G. 9

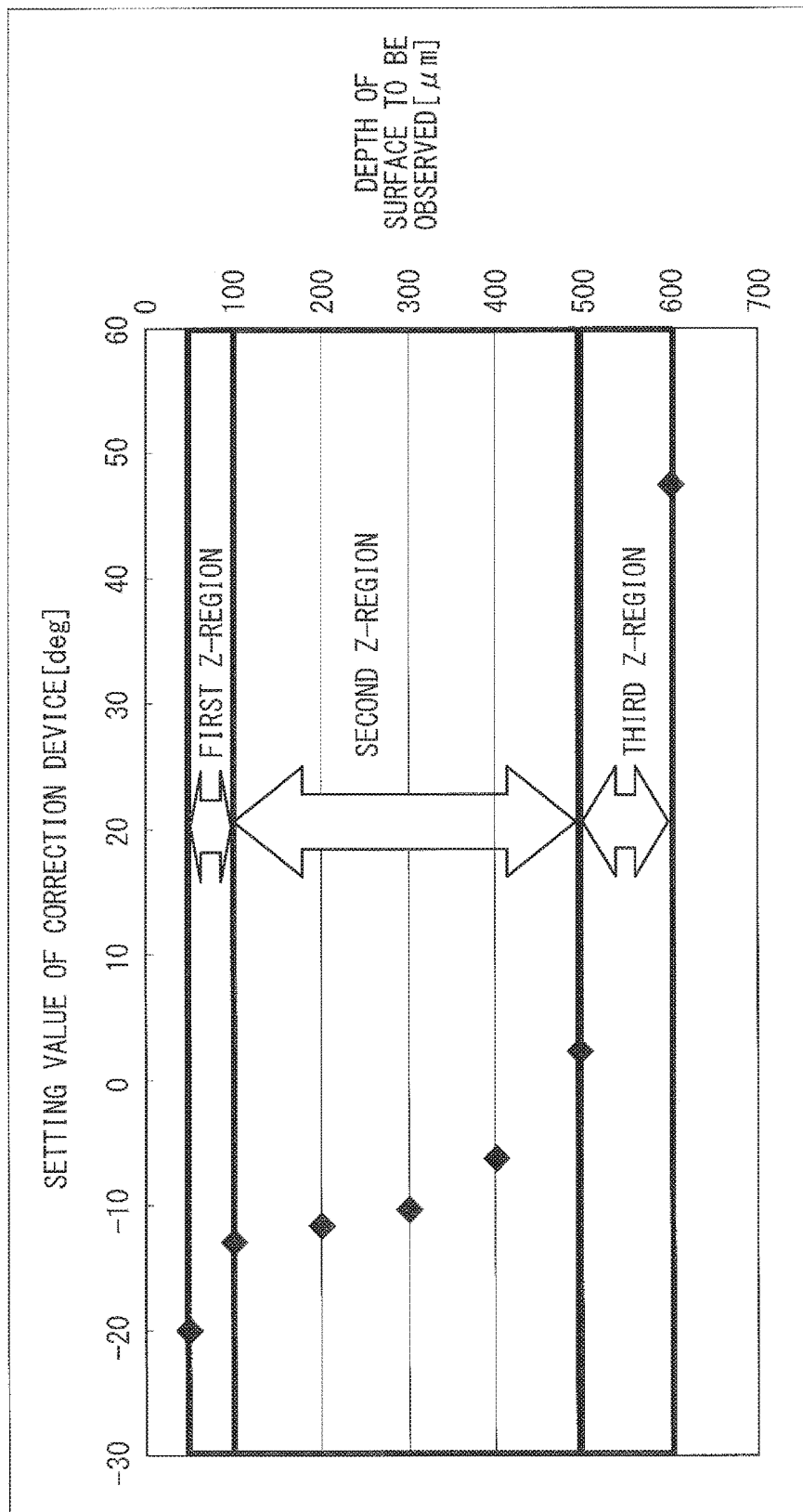
F I G. 1 0

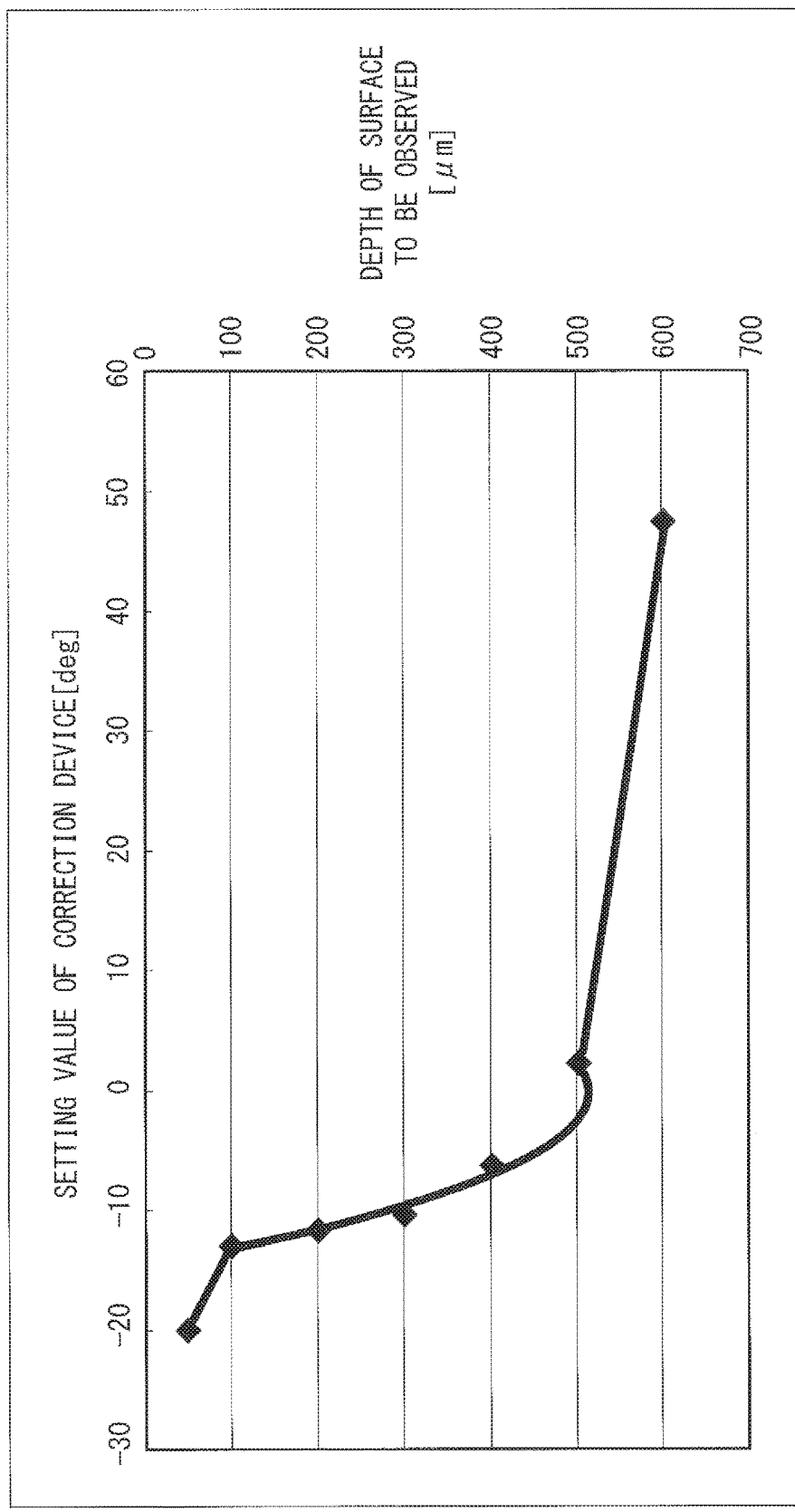
F I G. 13

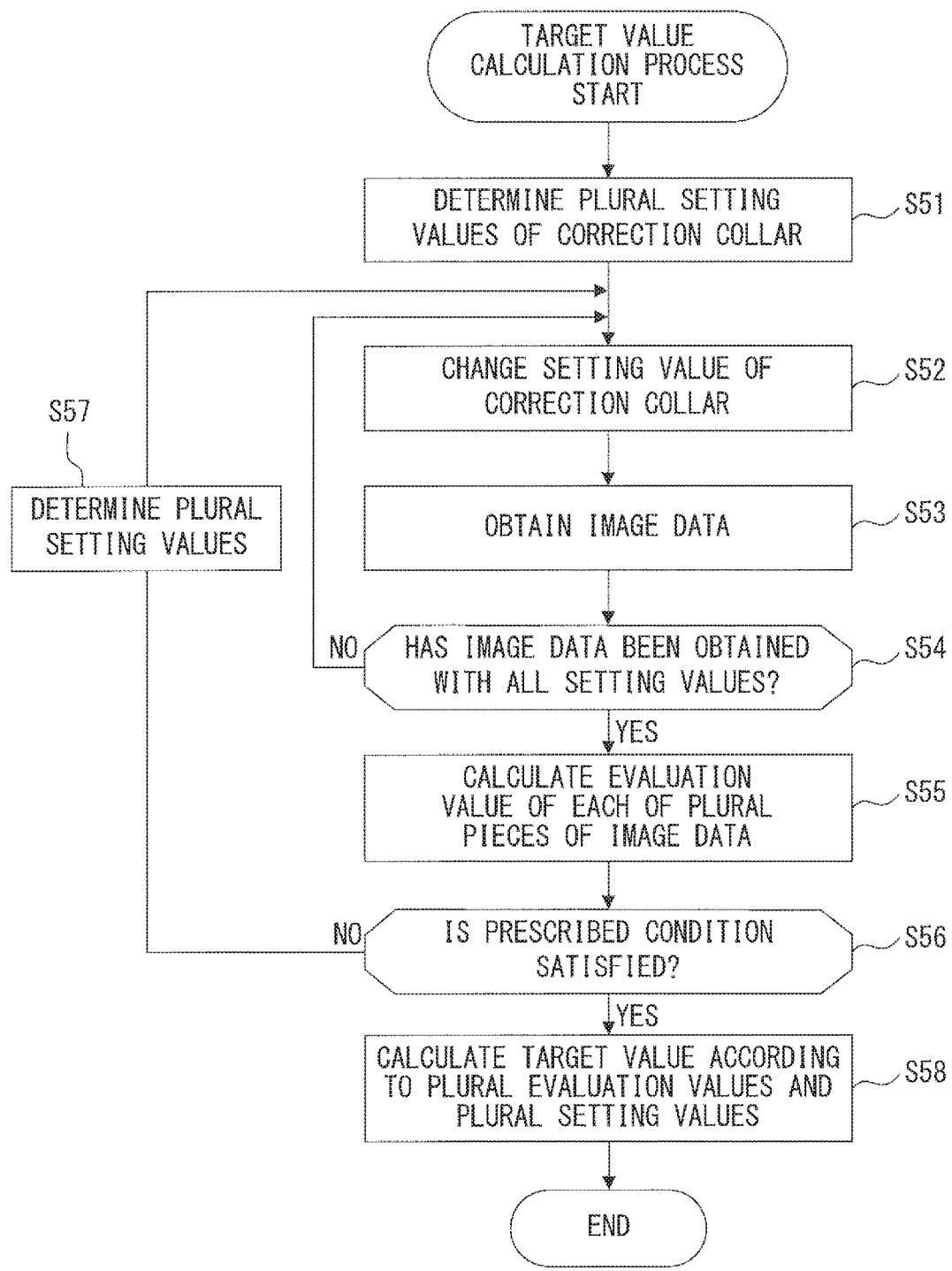
F I G. 1 8

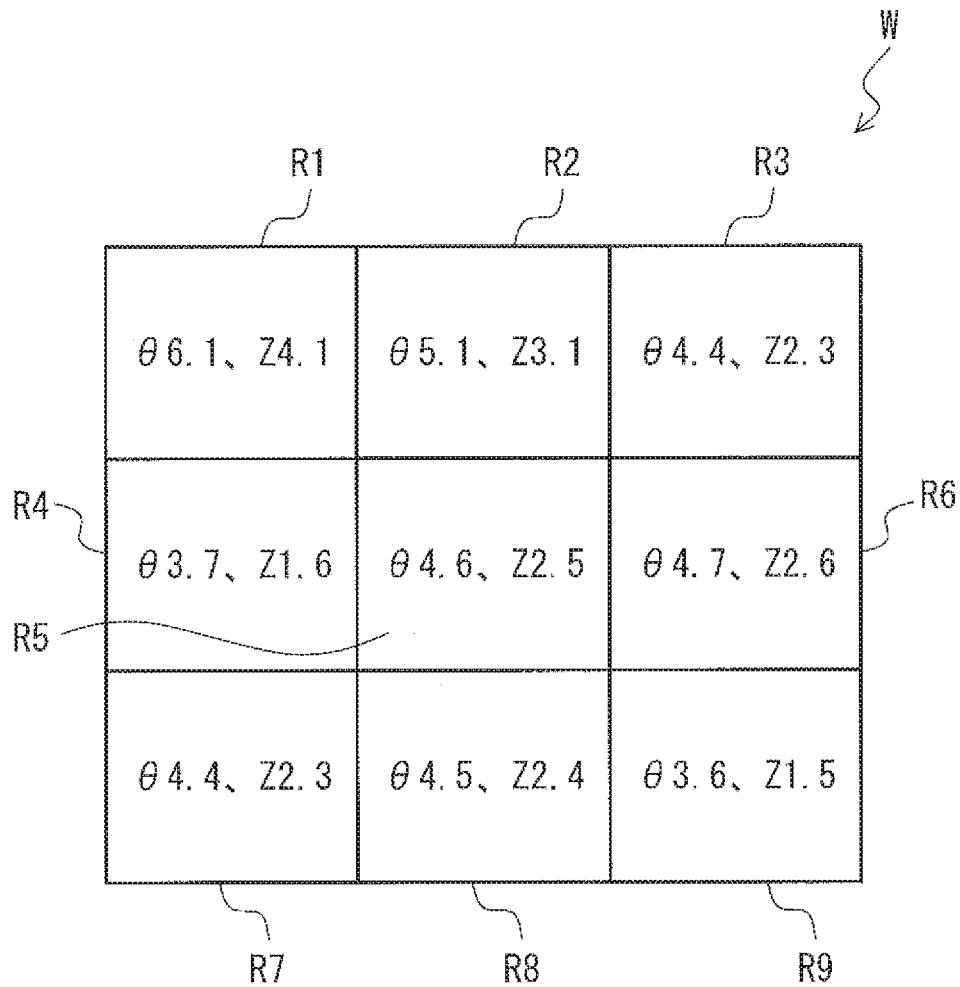
F I G. 2 2

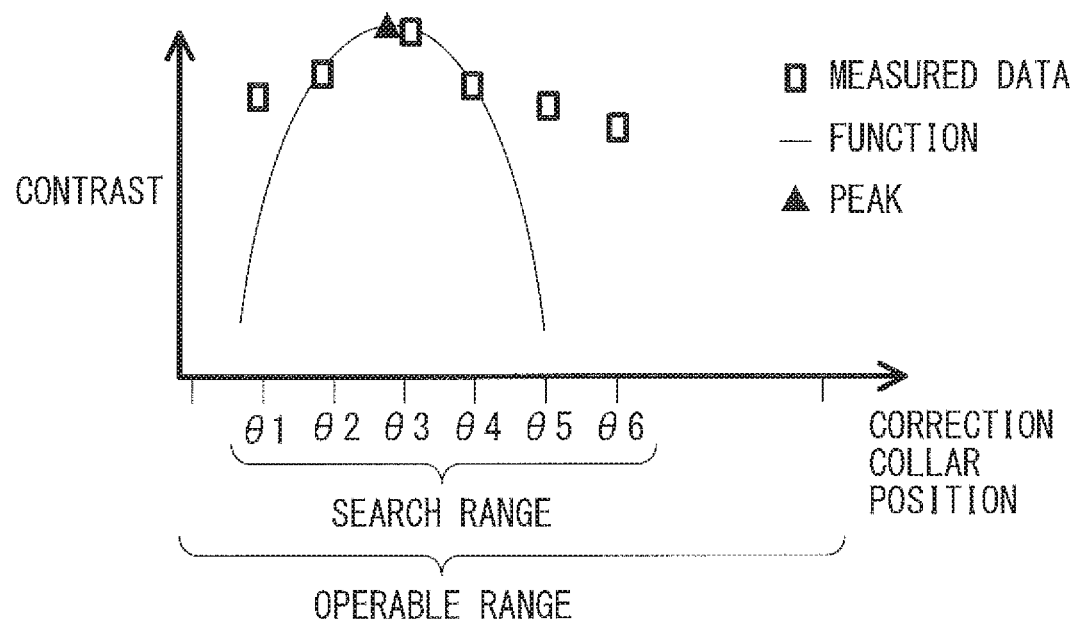
F I G. 2 4

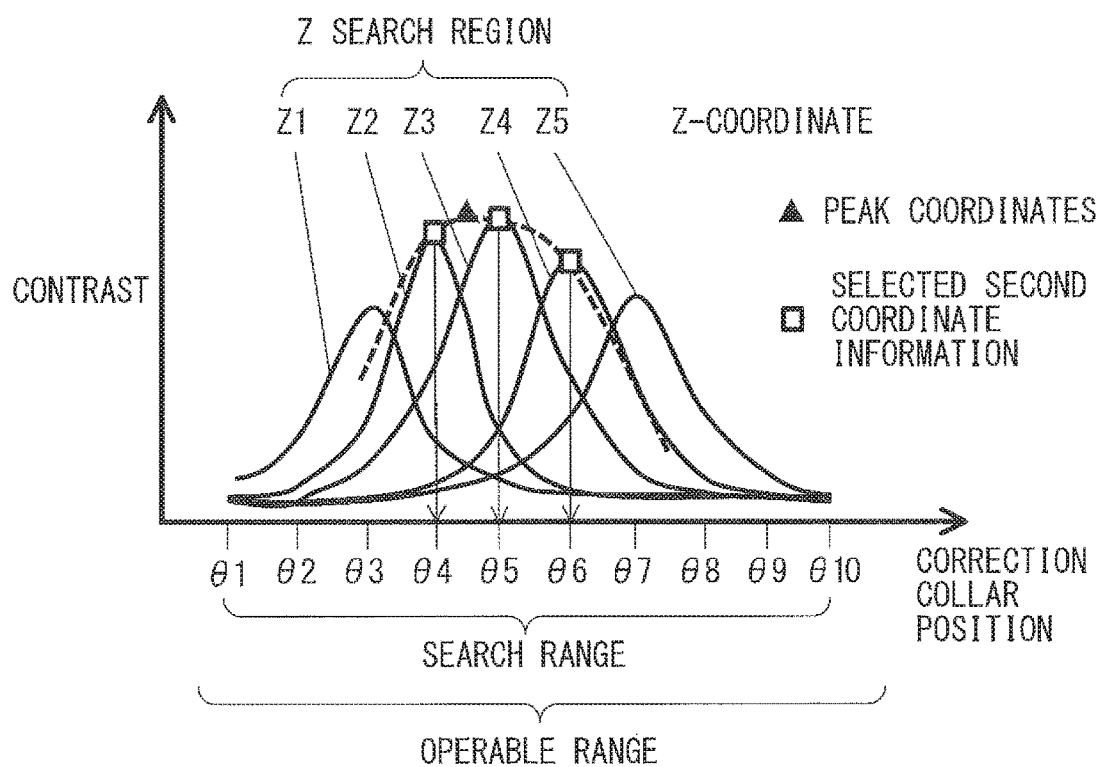
F I G. 2 7

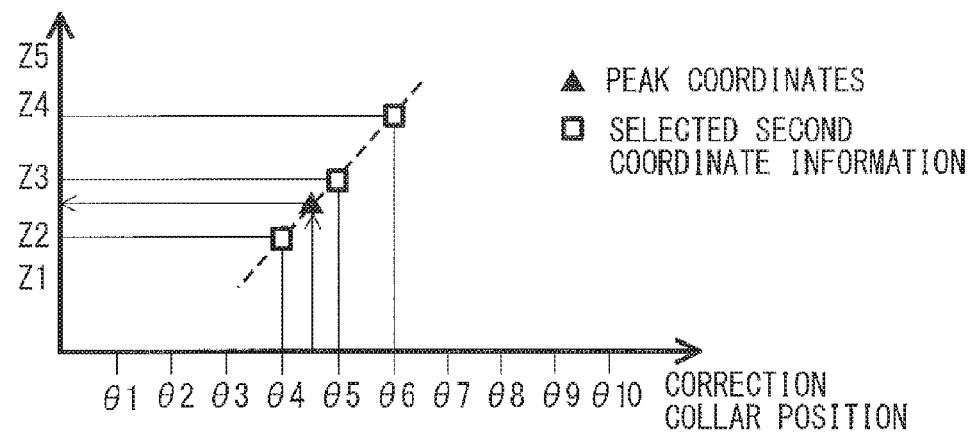
F I G. 28

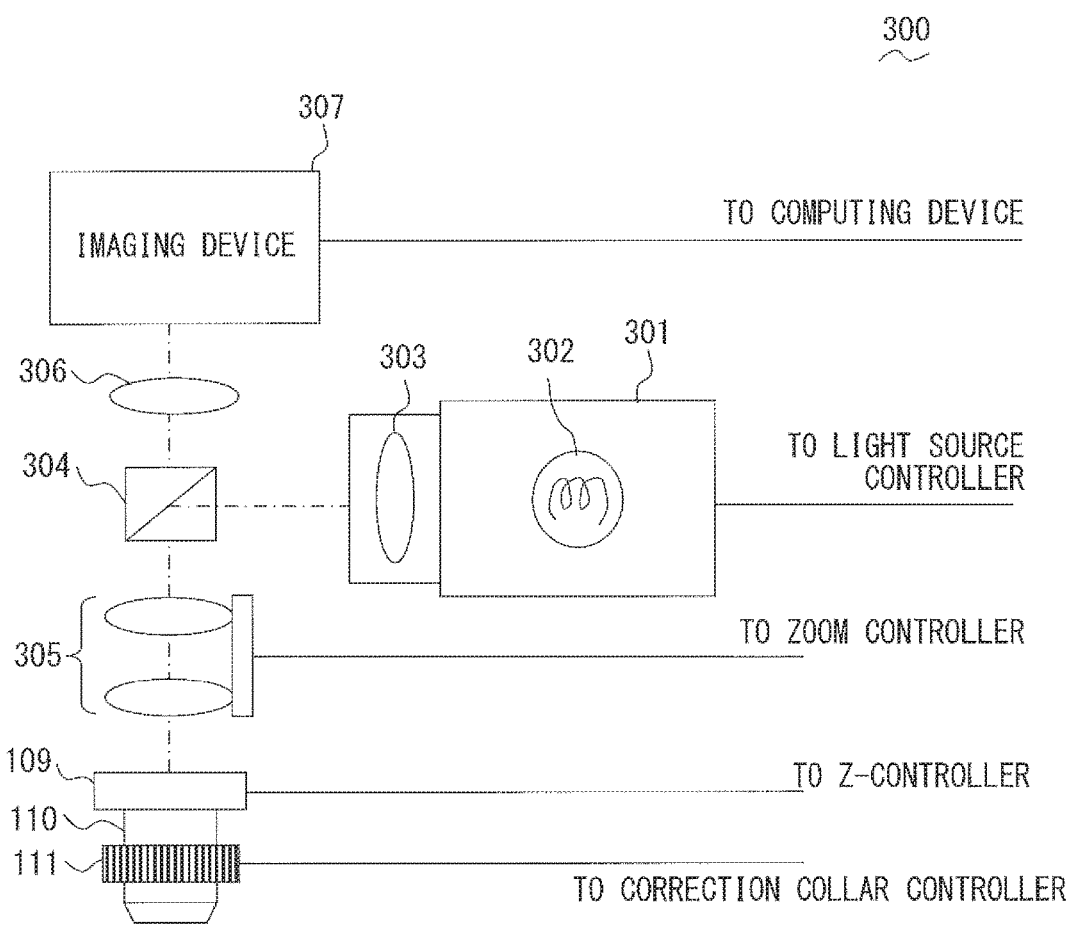
F I G. 3 1

MICROSCOPE SYSTEM AND SETTING VALUE CALCULATION METHOD

CROSS REFERENCE TO RELATED APPLICATIONS

This application is based upon and claims the benefit of priority from prior Japanese Patent Applications No. 2014-253526, filed Dec. 15, 2014, No. 2014-253527, filed Dec. 15, 2014 and No. 2014-253528, filed Dec. 15, 2014, the entire contents of which are incorporated herein by this reference.

BACKGROUND OF THE INVENTION

Field of the Invention

The present invention relates to a microscope system, and a method for calculating a setting value of a correction device that corrects a spherical aberration.

Description of the Related Art

It is known that, in observing a sample by using a microscope, a different amount of spherical aberration is generated depending on a thickness of a cover glass. As a means for correcting a spherical aberration caused by the thickness of the cover glass, a correction collar of an objective is known.

Conventionally, a correction collar has been used primarily as a means for correcting a spherical aberration caused by the thickness of the cover glass. In recent years, a technique for observing a deep portion of a sample (for example, a biological sample) has been developed and widely used, and the correction collar can also be used to correct a spherical aberration that varies according to a depth of a surface to be observed.

However, it is difficult to determine whether a spherical aberration has been corrected while observing an image of a sample. Therefore, a task of correcting a spherical aberration by using a correction collar is likely to be skirted, and at the moment, it is difficult to say that the correction collar is being fully utilized as a means for correcting the spherical aberration.

SUMMARY OF THE INVENTION

An aspect of the present invention is to provide a microscope system that includes: a microscope apparatus including a correction device that corrects a spherical aberration, the microscope apparatus obtaining image data of a surface to be observed of a sample in each of the plurality of states having different setting values of the correction device so as to obtain plural pieces of image data; and a computing device that calculates an evaluation value of the image data on the basis of each of the plural pieces of image data obtained by the microscope apparatus so as to calculate evaluation values of the plural pieces of image data, the evaluation value indicating a larger value as the spherical aberration is corrected more satisfactorily, wherein the microscope apparatus repeats a process of obtaining the plural pieces of image data in such a way that a distribution range and an average interval of the setting values of the correction device are narrowed in each repetition, the setting values being set in the plurality of states, and that a setting value of the correction device that corresponds to a maximum evaluation value calculated by the computing device is included within the distribution range, and the computing device calculates a target value on the basis of the evaluation values calculated by the computing device and the setting values that correspond to the evaluation values, the target value being the setting value of the correction device for correcting the spherical aberration on the surface to be observed.

Another aspect of the present invention is to provide a microscope system that includes: a microscope apparatus including a correction device that corrects a spherical aberration, the microscope apparatus obtaining image data of a surface to be observed of a sample in each of the plurality of states having different setting values of the correction device so as to obtain plural pieces of image data; and a computing device that calculates an evaluation value of the image data on the basis of each of the plural pieces of image data obtained by the microscope apparatus so as to calculate the evaluation values of the plural pieces of image data, the evaluation value indicating a larger value as the spherical aberration is corrected satisfactorily more, wherein when a combination of the evaluation value calculated by the computing device and the setting value of the correction device that corresponds to the evaluation value is defined to be first coordinate information, the computing device calculates a function using interpolation or function approximation on the basis of the first coordinate information of three or more pieces of image data selected from the plural pieces of image data, the three or more pieces of image data including the image data for which a maximum evaluation value of the evaluation values is calculated, and calculates a target value from the calculated function, the target value being the setting value of the correction device for correcting the spherical aberration on the surface to be observed.

Yet another aspect of the present invention is to provide a setting value calculation method that includes: obtaining, by a microscope apparatus including a correction device that corrects a spherical aberration, image data of a surface to be observed of a sample in each of the plurality of states having different setting values of the correction device so as to obtain plural pieces of image data; calculating, by a computing device, an evaluation value of the image data on the basis of each of the plural pieces of image data obtained by the microscope apparatus so as to calculate the evaluation values of the plural pieces of image data, the evaluation value indicating a larger value as the spherical aberration is corrected satisfactorily more; repeating, by the microscope apparatus, the obtaining of the plural pieces of image data in such a way that a distribution range and an average interval of the setting values of the correction device are narrowed in each repetition, the setting values being set in the plurality of states, and that the setting value of the correction device that corresponds to a maximum evaluation value calculated by the computing device is included within the distribution range; and calculating, by the computing device, a target value on the basis of the evaluation values calculated by the computing device and the setting values that correspond to the evaluation values, the target value being the setting value of the correction device for correcting the spherical aberration in the surface to be observed.

BRIEF DESCRIPTION OF THE DRAWINGS

The present invention will be more apparent from the following detailed description when the accompanying drawings are referenced.

FIG. 4 is a flowchart of a function calculation process performed in a microscope system according to Embodiment 1 of the present invention.

FIG. 9 illustrates an inclination of a target value in a Z-position that is calculated in the process of step S11 of FIG. 8.

FIG. 10 illustrates a plurality of Z-regions determined in the process of step S12 of FIG. 8.

FIG. 13 illustrates yet another example of a total function calculated in the process of step S14 of FIG. 8.

FIG. 18 is a flowchart of a target value calculation process performed in each Z-position in a microscope system according to Embodiment 1 of the present invention.

FIG. 19A illustrates initially determined setting values and evaluation values that correspond to the setting values. FIG. 19B illustrates setting values determined the second time and evaluation values that correspond to the setting values.

FIG. 22 illustrates an example in which the entire region of image data is divided into nine regions and a region combination is calculated for each of the regions.

FIG. 24 is a diagram explaining the target value calculation process illustrated in FIG. 23.

FIG. 27 is a diagram explaining the process illustrated in FIG. 26, and illustrates a method for calculating a function of a target value and an evaluation value.

FIG. 28 is a diagram explaining the process illustrated in FIG. 26, and illustrates a method for calculating a function of a target value and a Z-position.

FIG. 31 illustrates a configuration of a microscope according to Embodiment 3 of the present invention.

DESCRIPTION OF THE EMBODIMENTS

Figure 1:
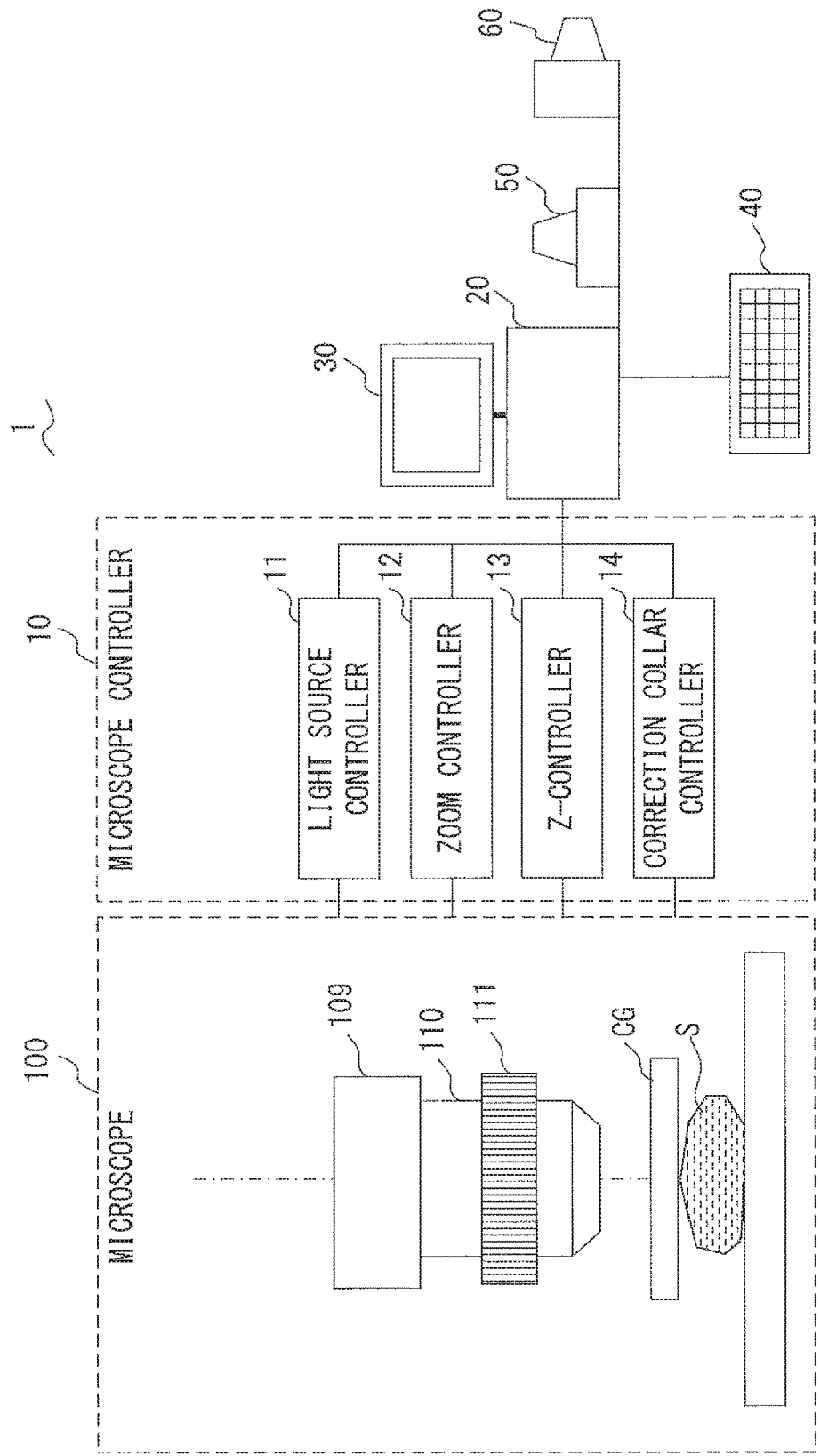
FIG. 1 illustrates a configuration of a microscope system according to Embodiment 1 of the present invention.

A technology for supporting a user of a microscope to use a correction collar is described, for example, in Japanese Laid-Open Patent Publication No. 2014-160213. Japanese Laid-Open Patent Publication No. 2014-160213 describes a technology for specifying, in each Z-position, image data in which a spherical aberration has been corrected from among plural pieces of image data obtained with different setting values of a correction collar so as to determine the setting value of the correction collar with which the spherical aberration is corrected in each of the Z-positions. It also describes a technology for calculating the setting values of the correction collar with which the spherical aberration is corrected in plural Z-positions, and calculating a function indicating a relationship between the Z-position and the setting value of the correction collar, the spherical aberration being corrected using this setting value, on the basis of plural combinations of the Z-position and the setting value of the correction collar using interpolation. A microscope system having a functional capability of supporting the use of a correction collar by a user of a microscope, as described in Japanese Laid-Open Patent Publication No. 2014-160213, can urge the user to use the correction collar.

However, when it takes much time for the functional capability above to set the correction collar (namely, to correct a spherical aberration), an effect of the functional capability is limited. Completing correction of the spherical aberration in a short time is a critical element in urging the positive utilization of the correction collar.

When a correction collar is being used to correct a spherical aberration that varies according to a depth of a surface to be observed, it is assumed that a biological sample is being used for an object to be observed. In observing the biological sample, it is important to suppress damage to the biological sample, and this point applies to correction of the spherical aberration as well.

In the description above, the correction collar has been described as an example of means for correcting a spherical aberration that varies according to the thickness of a cover glass or the depth of a surface to be observed; however, a similar problem can be caused in any means for correcting the spherical aberration.

There are few specific descriptions of methods for calculating a function in Japanese Laid-Open Patent Publication No. 2014-160213. Therefore, depending on the method for calculating a function, an accuracy of a function obtained in the technology described in Japanese Laid-Open Patent Publication No. 2014-160213 (namely, an accuracy in correcting a spherical aberration using a setting value in each Z-position determined on the basis of the function) may be able to be improved.

Further, in the technology described in Japanese Laid-Open Patent Publication No. 2014-160213, a region to be observed in a sample (hereinafter referred to as a "region of interest") is not considered in calculating a function. In order to observe a region of interest in a state in which a spherical aberration has been corrected with a high accuracy, it is preferable that the function be calculated from a combination of a Z-position within a Z-region that corresponds to the region of interest (hereinafter referred to as a "Z-region of interest") and a setting value of a correction collar. However, in the technology described in Japanese Laid-Open Patent Publication No. 2014-160213, it is difficult to specify the region of interest and the Z-region of interest before calculation of the function.

Embodiments are described below in detail.

Embodiment 1

Figure 2:
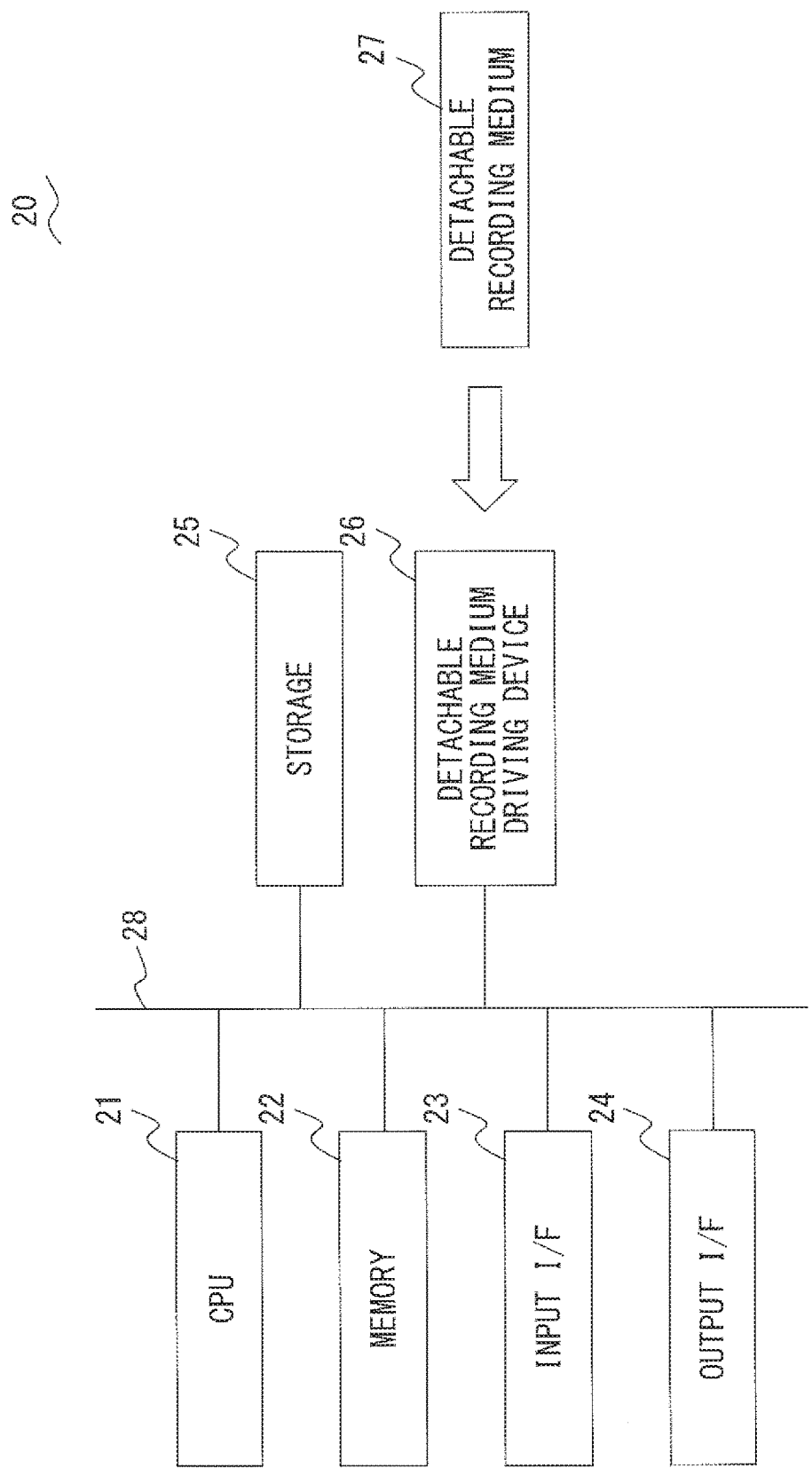
FIG. 2 illustrates a configuration of a computing device illustrated in FIG. 1.
Figure 3:
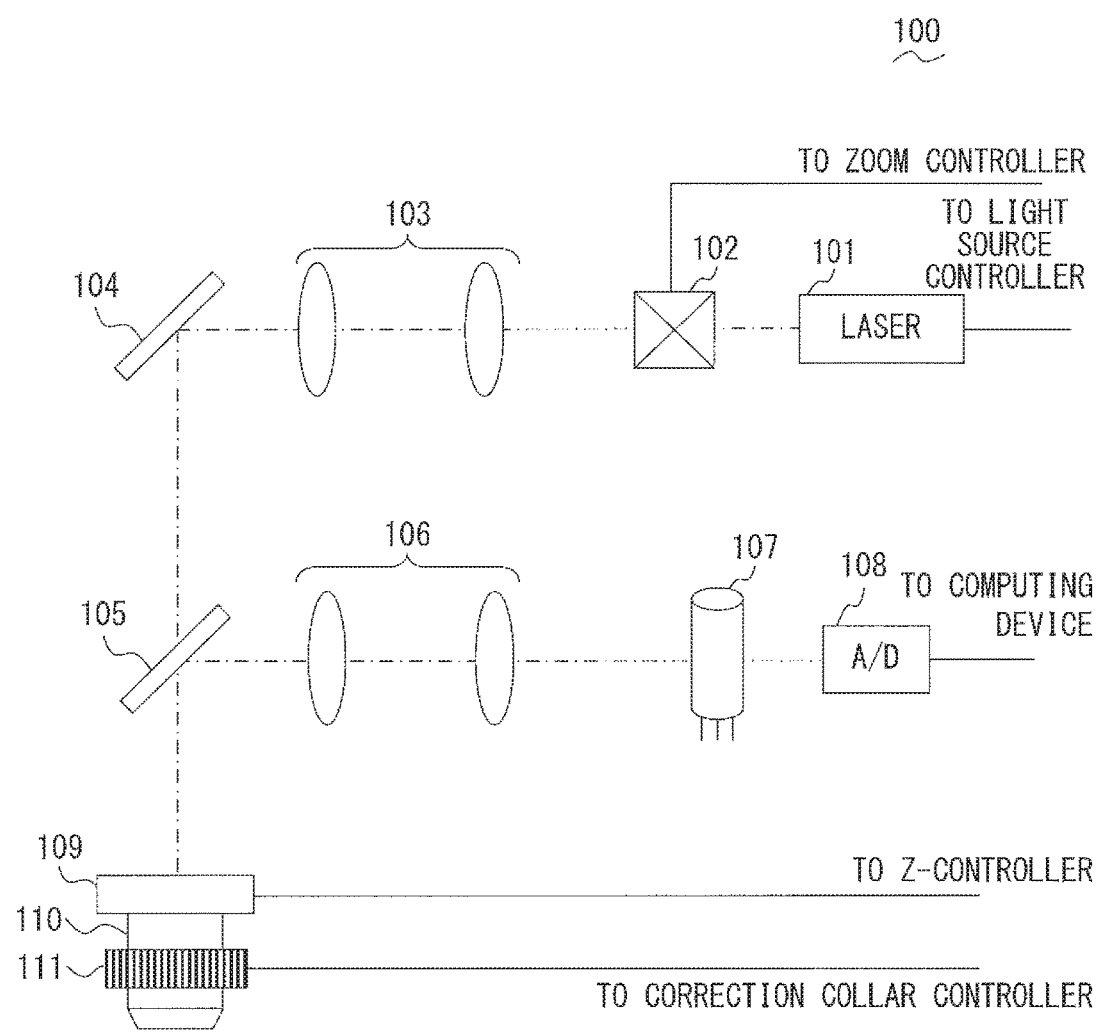
FIG. 3 illustrates a configuration of a microscope illustrated in FIG. 1.

FIG. 1 illustrates a configuration of a microscope system according to this embodiment. FIG. 2 illustrates a configuration of a computing device 20 illustrated in FIG. 1. FIG. 3 illustrates a configuration of a microscope 100 illustrated in FIG. 1.

The microscope system 1 illustrated in FIG. 1 includes a microscope 100, a microscope controller 10, a computing device 20, a display 30, and a plurality of input devices (a keyboard 40, a correction collar operating device 50, and a Z drive unit operating device 60) for inputting an instruction to the computing device 20.

The microscope controller 10 is a device that controls an operation of the microscope 100 according to an instruction from the computing device 20. The microscope controller 10 generates control signals for controlling operations of various electric units of the microscope 100. The microscope controller 10 includes a light source controller 11 that controls an output of a light source, a zoom controller 12 that controls a zoom magnification, a Z-controller 13 that controls a Z-position of an objective 110, and a correction collar controller 14 that controls a setting value of a correction collar 111. The Z-position is a relative position in an optical axis direction of the objective 110 with respect to a sample S (a front focal position of the objective 110). The setting value of the correction collar 111 is, for example, a rotation angle of the correction collar 111 with respect to a reference position.

The computing device 20 is a computer that performs various types of processing. The computing device 20 includes, for example, a CPU (Central Processing Unit) 21, a memory 22, an input I/F device 23, an output I/F device 24, a storage 25, and a removable recording medium driving device 26 into which a removable recording medium 27 is inserted, as illustrated in FIG. 2. There components are connected to each other via a bus 28. The computing device 20 has a function of instructing the microscope controller 10 to control the microscope 100, a function of generating image data on the basis of an output from the microscope 100, and a function of making the display 30 display a three-dimensional image or the like. The computing device 20 further has a function of calculating a relationship between a Z-position of the objective 110 and a setting value of the correction collar 111 with which a spherical aberration is corrected, and a function of calculating the setting value of the correction collar 111 with which the spherical aberration is corrected. FIG. 2 illustrates an example of the configuration of the computing device 20, and the configuration of the computing device 20 is not limited to this configuration.

The CPU 21 executes a prescribed program so as to perform processing. The memory 22 is, for example, a RAM (Random Access Memory), and transitorily stores a program or data stored in the storage 25 or the removable recording medium 27.

The input I/F device 23 is a means for receiving signals from the keyboard 40, the correction collar operating device 50, the Z drive unit operating device 60, and the display 30, and functions as an input receiver that receives an input from an observer. The input I/F device 23 receives signals from an A/D converter 108 of the microscope 100, which is described later with reference to FIG. 3.

The output I/F device 24 is a means for outputting signals to the display 30 and the microscope controller 10. Namely, the output I/F device 24 and the computing device 20 including the output I/F device 24 are a display controller that controls display of the display 30, and are a microscope control instructing device that instructs the microscope controller 10 to control the microscope 100.

The storage 25 is, for example, a hard disk storage, and is used primarily to store various pieces of data or programs. The removable recording medium driving device 26 accommodates the removable recording medium 27, such as an optical disk or a CompactFlash (registered trademark), and the removable recording medium 27 has a function of assisting the storage 25.

Examples of the display 30 include a liquid crystal display, an organic EL display, and a CRT display. The display 30 may include a touch panel sensor. In this case, the display 30 also functions as an input device.

The keyboard 40 functions as region specifying means that specifies a region of interest in a three-dimensional image displayed in the display 30, as described later. The display 30 that functions as an input device or another input device may function as the region specifying means, instead of the keyboard 40.

The correction collar operating device 50 is an input device for instructing a setting value of the correction collar 111. When a user instructs the setting value of the correction collar 111 by using the correction collar operating device 50, the correction collar controller 14 changes the setting value of the correction collar 111 to an instructed value.

The Z drive unit operating device 60 is an input device for instructing a change in a Z-position of the objective 110. When a user instructs the change in the Z-position by using the Z drive unit operating device 60, the Z-controller 13 moves a Z drive unit 109 in the optical axis direction so as to change the Z-position of the objective 110.

The microscope 100 is a two-photon excitation microscope. A sample S is a biological sample such as the brain of a mouse, and a cover glass CG is placed on the sample S. The microscope 100 includes a laser 101, a scanning unit 102, a pupil projection optical system 103, a mirror 104, a dichroic mirror 105, and an objective 110 on an illumination light path, as illustrated in FIG. 3.

The laser 101 is, for example, an ultrashort pulse laser, and oscillates a laser beam in a near-infrared region. An output of the laser 101 is controlled by the light source controller 11. Namely, the light source controller 11 is a laser controller that controls the power of a laser beam applied to a sample.

The scanning unit 102 is a scanner that two-dimensionally scans the sample S with a laser beam, and includes, for example, a galvano-scanner, a resonant scanner, and the like.

A zoom magnification is changed by changing a scan field of the scanning unit 102. The scan field of the scanning unit 102 is controlled by the zoom controller 12.

The pupil projection optical system 103 is an optical system that projects the scanning unit 102 in a pupil position of the objective 110. The dichroic mirror 105 is a beam splitter that splits excitation light (a laser beam) and detection light (fluorescence) from the sample S, and splits the laser beam and the fluorescence according to a wavelength.

The objective 110 is a dry or immersion type objective including the correction collar 111, and is mounted on the Z drive unit 109. The Z drive unit 109 is a means for moving the objective 110 in the optical axis direction of the objective 110. Movement of the Z drive unit 109 (namely, movement of the objective 110) is controlled by the Z-controller 13.

The correction collar 111 is a correction device that moves a lens in the objective 110 by changing a setting value of the correction collar 111 so as to correct a spherical aberration. The setting value of the correction collar 111 is changed by the correction collar controller 14. The setting value of the correction collar 111 can be manually changed by directly operating the correction collar 111.

The microscope 100 further includes a pupil projection optical system 106 and a photodetector 107 on a detection light path (a reflected light path of the dichroic mirror 105). A signal output from the photodetector 107 is output to the A/D converter 108.

The pupil projection optical system 106 is an optical system that projects a pupil of the objective 110 to the photodetector 107. The photodetector 107 is, for example, a photomultiplier tube (PMT), and outputs an analog signal according to a light quantity of incident fluorescence. The A/D converter 108 converts the analog signal from the photodetector 107 into a digital signal (a luminance signal), and outputs the digital signal to the computing device 20.

In the microscope system 1 having the configuration above, the microscope 100 uses the scanning unit 102 to scan the sample S with a laser beam, and detects fluorescence from respective positions of the sample S by using the photodetector 107. Then, the computing device 20 generates image data on the basis of a digital signal (a luminance signal) into which a signal from the photodetector 107 has been converted and scanning information of the scanning unit 102. Namely, in the microscope system 1, a microscope apparatus that is configured of the microscope 100 and the computing device 20 obtains image data of the sample S.

FIG. 4 is a flowchart of a function calculation process performed in the microscope system 1. With reference to FIG. 4, the function calculation process, which is a process of calculating a function indicating a relationship between a Z-position and a setting value (a target value) of a correction collar with which a spherical aberration is corrected, is described below.

The microscope system 1 makes the display 30 display a three-dimensional image of the sample S (step S1). Here, the computing device 20 determines plural Z-positions in which image data should be obtained in order to generate a three-dimensional image. For example, a user inputs a Z-region in which image data should be obtained and a Z-interval, and the computing device 20 determines plural Z-positions on the basis of the Z-region and the Z-interval. The Z-region is a range of the Z-positions, and the Z-interval is an interval between the Z-positions. Then, in accordance with an instruction of the computing device 20, the Z-controller 13 moves the Z drive unit 109 in the optical axis direction, and sequentially moves the objective 110 in the determined plural Z-positions. The microscope apparatus obtains image data of the sample S in the respective Z-positions. Finally, the computing device 20 makes the display 30 display a three-dimensional image of the sample S on the basis of the image data obtained in the plural Z-positions (Z stack image data). Namely, the computing device 20 is a display controller that causes the display 30 to display a three-dimensional image. A method for generating three-dimensional image data on the basis of the Z stack image data is known, and the detailed description thereof is omitted.

Figure 5:
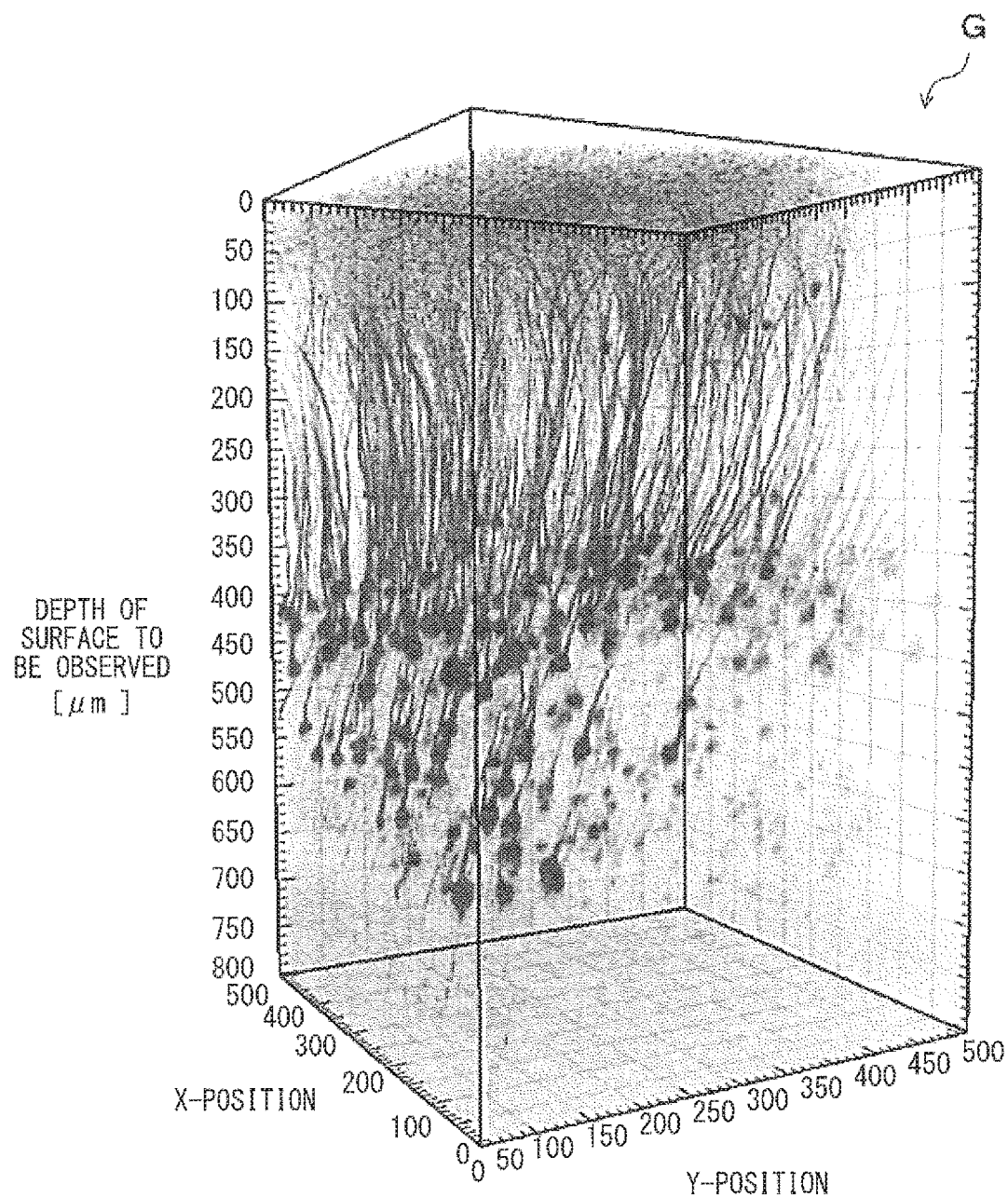
FIG. 5 illustrates an example of a three-dimensional image of a sample displayed in a display illustrated in FIG. 1.

FIG. 5 illustrates an example of a three-dimensional image of the sample S displayed in the display 30. A three-dimensional image G illustrated in FIG. 5 is an image of the brain of a mouse, and shows a state in which a structure of the brain is changed in a Z-direction (a depth direction).

Figure 6:
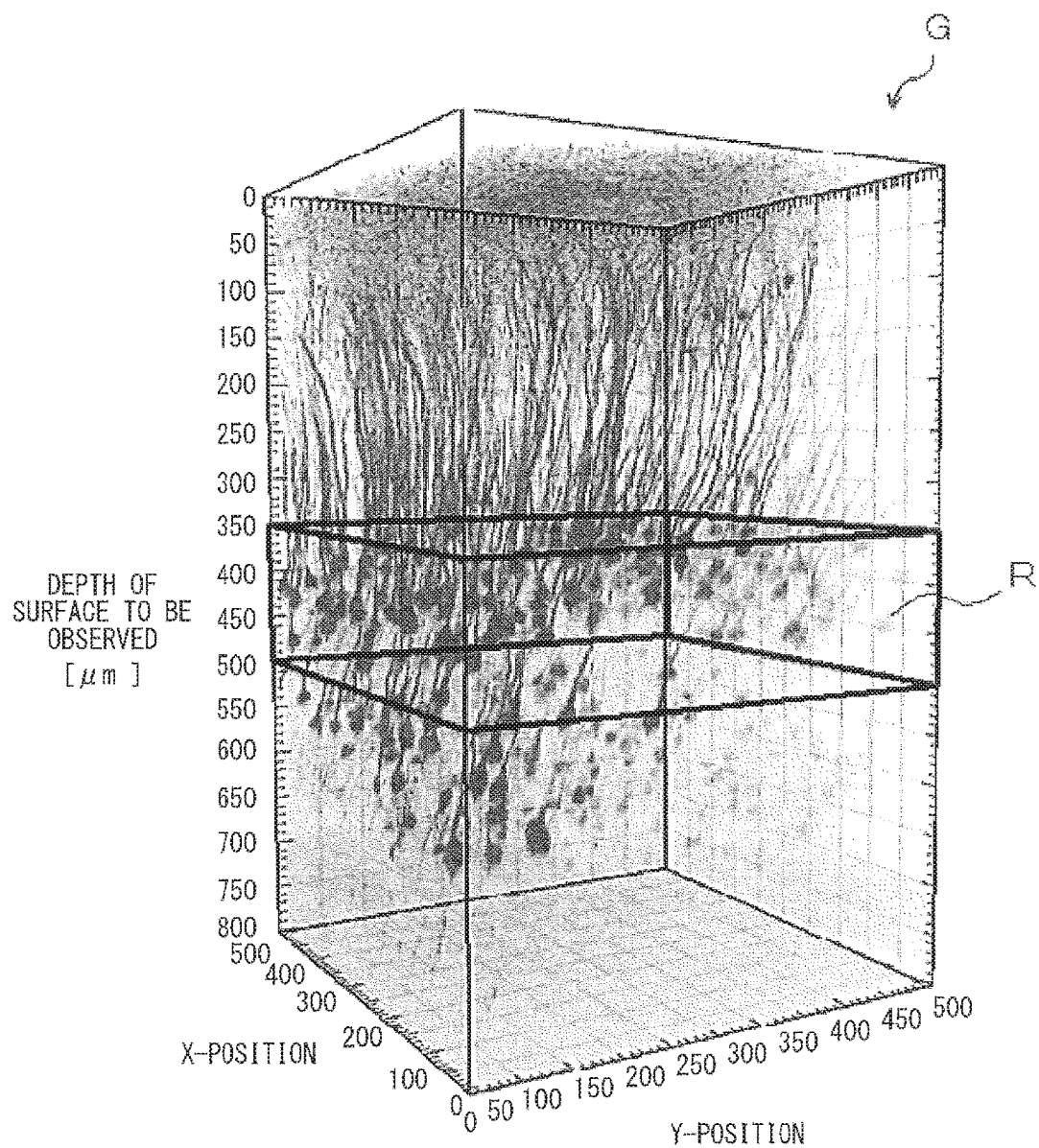
FIG. 6 illustrates a state in which a region of interest R is specified on a screen on which a three-dimensional image illustrated in FIG. 5 is displayed.

When a three-dimensional image is displayed, the microscope system 1 receives the specification of a region of interest (step S2). Here, a user who refers to the three-dimensional image G displayed in the display 30 in step S1 so as to confirm the structure of the sample S uses an input device such as the keyboard 40 to specify the region of interest R in the three-dimensional image G. FIG. 6 illustrates a state in which a range of a depth of a surface to be observed of 350 µm to 500 µm is specified as the region of interest Ron a screen on which the three-dimensional image G is displayed. When the region of interest R is specified, the computing device 20 receives information relating to the specified region of interest R.

When the region of interest is specified on the three-dimensional image, the microscope system 1 determines a plurality of Z-positions (step S3). Here, the computing device 20 determines a plurality of Z-positions in which image data should be obtained in order to calculate a function indicating a relationship between a Z-position and a target value, on the basis of the information relating to the region of interest R. As an example, the computing device 20 may determine the plurality of Z-positions on the basis of a Z-region of the objective 110 specified by the region of interest R (a Z-region that corresponds to a depth of 350 µm to 500 µm) and a predetermined fixed interval (for example, an interval of 50 µm). The determined plurality of Z-positions are stored in the storage 25.

Then, the microscope system 1 changes the Z-position to an initial position (step S4). Here, in accordance with an instruction of the computing device 20, the Z-controller 13 moves the Z drive unit 109 in the optical axis direction so as to change the Z-position of the objective 110 to the initial position, which is one of the plurality of Z-positions determined in step S3. As a result, a surface to be observed of the sample S in which image data will be obtained later in order to calculate a target value is determined.

When the Z-position is changed, the microscope system 1 calculates a setting value of the correction collar 111 with which a spherical aberration on the surface to be observed is corrected (hereinafter referred to as a "target value") (step S5). Here, the computing device 20 calculates a target value in a current Z-position on the basis of plural pieces of image data that the microscope apparatus has obtained in the current Z-position. A process of calculating the target value is described later with reference to FIGS. 18 to 29.

When the target value is calculated, the microscope system 1 determines whether the target value has been calculated in all of the plurality of Z-positions determined in step S3 (step S6). When the target value has not been calculated in all of the plurality of Z-positions, the microscope system 1 changes the Z-position of the objective 110 to a Z-position in which the target value has not been calculated from among the plurality of Z-positions determined in step S3 (step S7). Then, the microscope system 1 calculates the target value in the changed Z-position (steps S5). By repeating these processes, a plurality of target values in a plurality of Z-positions are calculated on the basis of plural pieces of image data obtained in the respective Z-positions.

When the target value has been calculated in all of the Z-positions, the microscope system 1 calculates a function indicating a relationship between the Z-position and the target value (step S8). Here, the computing device 20 calculates a function for the Z-region of the objective 110 that is specified by the region of interest specified in step S2, on the basis of a plurality of combinations of the Z-position and the target value calculated in step S5. The computing device 20 may automatically calculate the function on the basis of obtained information, or the computing device 20 may calculate the function after a user inputs additional information, namely, the computing device 20 may semi-automatically calculate the function. The calculated function is stored in the storage 25.

Figure 7:
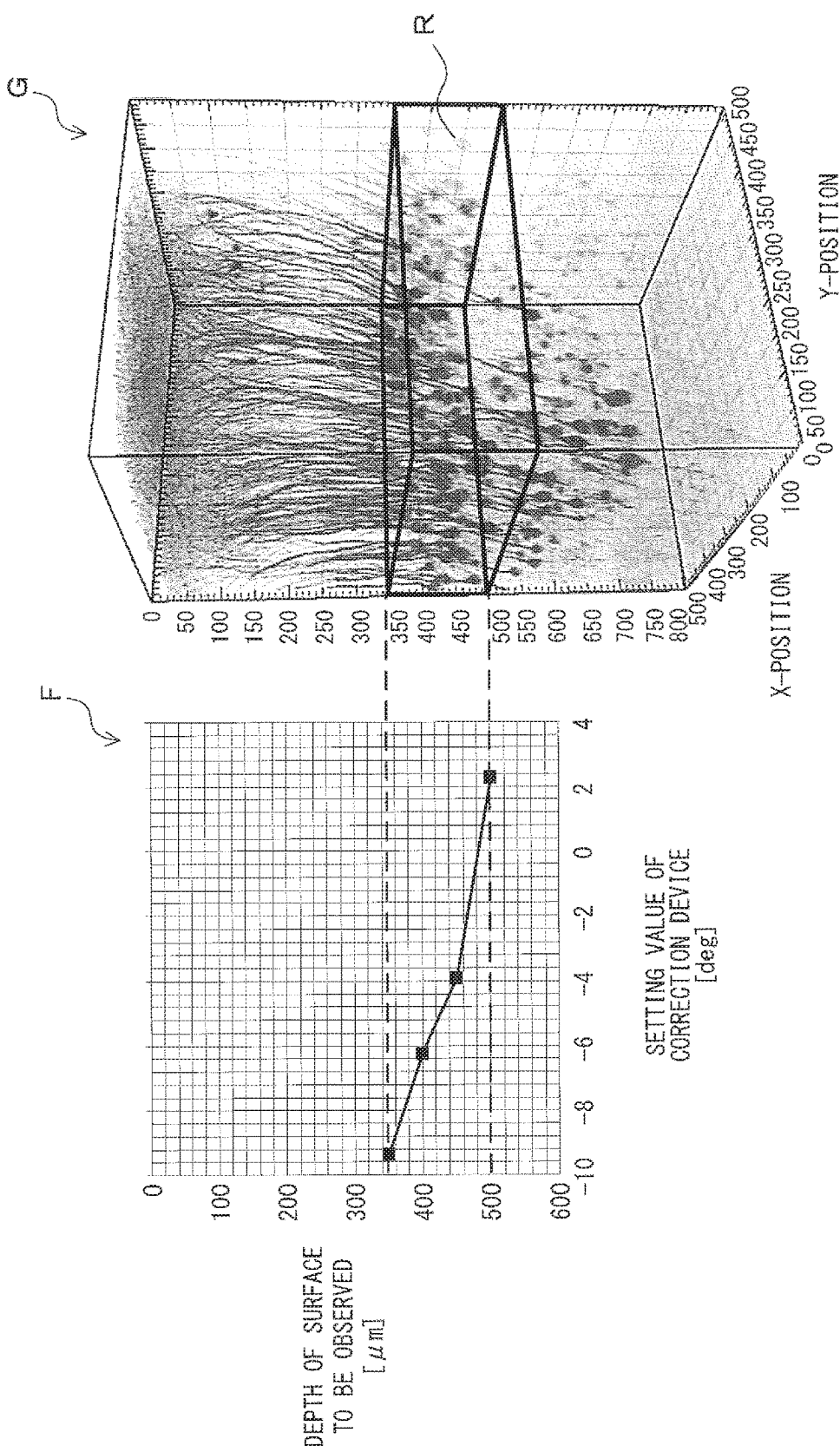
FIG. 7 illustrates a function in association with a three-dimensional image.

Finally, the microscope system 1 makes the display 30 display the function in association with the three-dimensional image (step S9), and finishes the function calculation process. Here, the computing device 20 makes the display 30 display the function calculated in step S8 in association with the three-dimensional image G. FIG. 7 illustrates an example in which the display 30 is made to display a graph F of the function calculated in step S8 and the three-dimensional image G so as to be arranged side by side. The horizontal axis of the graph F in FIG. 7 represents the setting value (namely, the target value) of the correction collar 111 with which a spherical aberration is corrected. The vertical axis represents a depth of a surface to be observed, and corresponds to the Z position of the objective 110 in one-to-one correspondence.

The microscope system 1 can easily calculate the function indicating the relationship between the Z-position and the target value by performing the processes illustrated in FIG. 4. In addition, in the microscope system 1, before calculation of the function, the three-dimensional image of the sample S is displayed, and the region of interest is specified by a user that has referred to the displayed three-dimensional image. As a result, the microscope system 1 can limit a target range of the function to the region of interest specified by the user. Therefore, a function for correcting a spherical aberration with a high accuracy within the region of interest can be calculated. Further, in the microscope system 1, the function calculated for the region of interest and the three-dimensional image are displayed in association with each other. Therefore, a user can guess a change in a refractive index or the like within the region of interest on the basis of the display. This is because a rate of change in the target value in the Z-position greatly depends on a refractive index of the sample S.

In step S8, it is preferable that the function be calculated with interpolation or function approximation. Arbitrary interpolation such as Lagrangian interpolation or spline interpolation may be employed for interpolation. Arbitrary approximation such as a least-squares method may be employed for function approximation. With interpolation or function approximation, the function can be calculated from a relatively small number of combinations of the Z-position and the target value. Therefore, the number of times of obtaining image data can be reduced, and accordingly, the function can be calculated in a short time while suppressing damage to the sample S.

In step S8, it is further preferable that the function be calculated with interpolation or function approximation on the basis of at least three combinations of the Z-position and the target value. This is because, even when the sample S has a structure in which a refractive index greatly varies according to a depth, a function in which a change in the target value due to a change in the refractive index is captured can be calculated.

The process of step S8 is described below in detail. The description below is given using as an example a case in which a range of a depth to be observed of 50 μm to 600 μm is specified as a region of interest.

Figure 8:
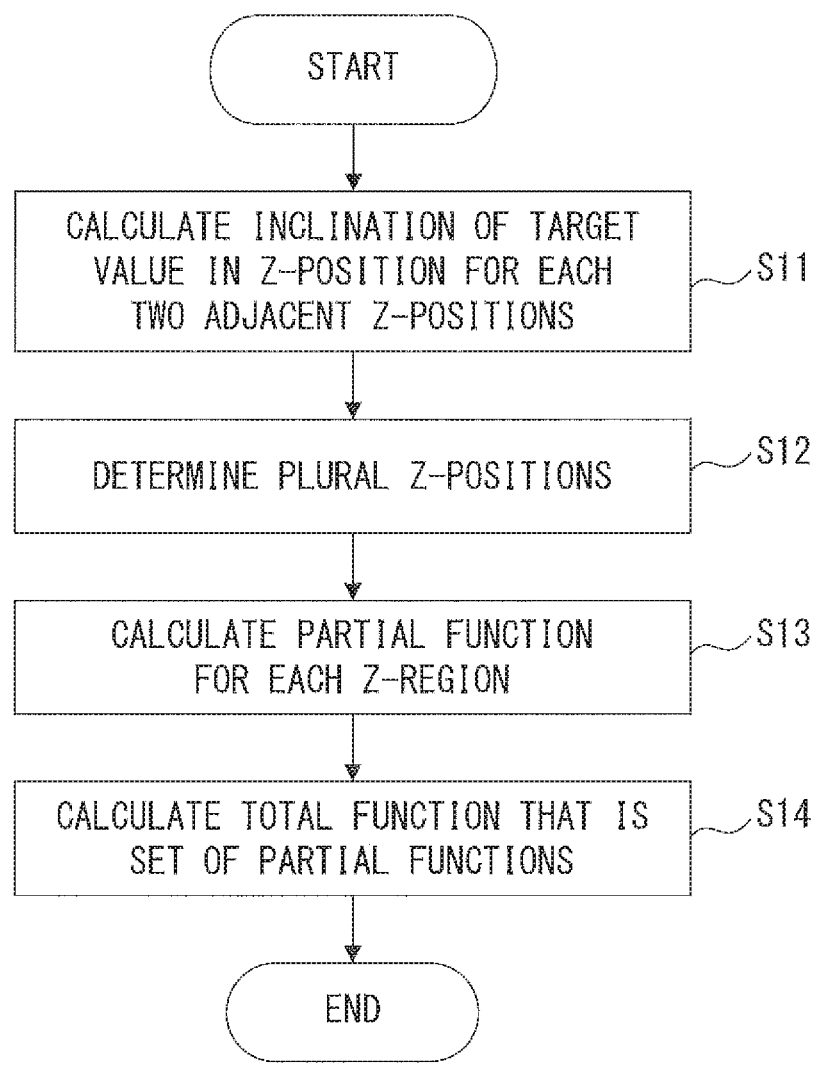
FIG. 8 is a flowchart illustrating a specific example in which the process of step S8 of FIG. 4 is automated.
Figure 11:
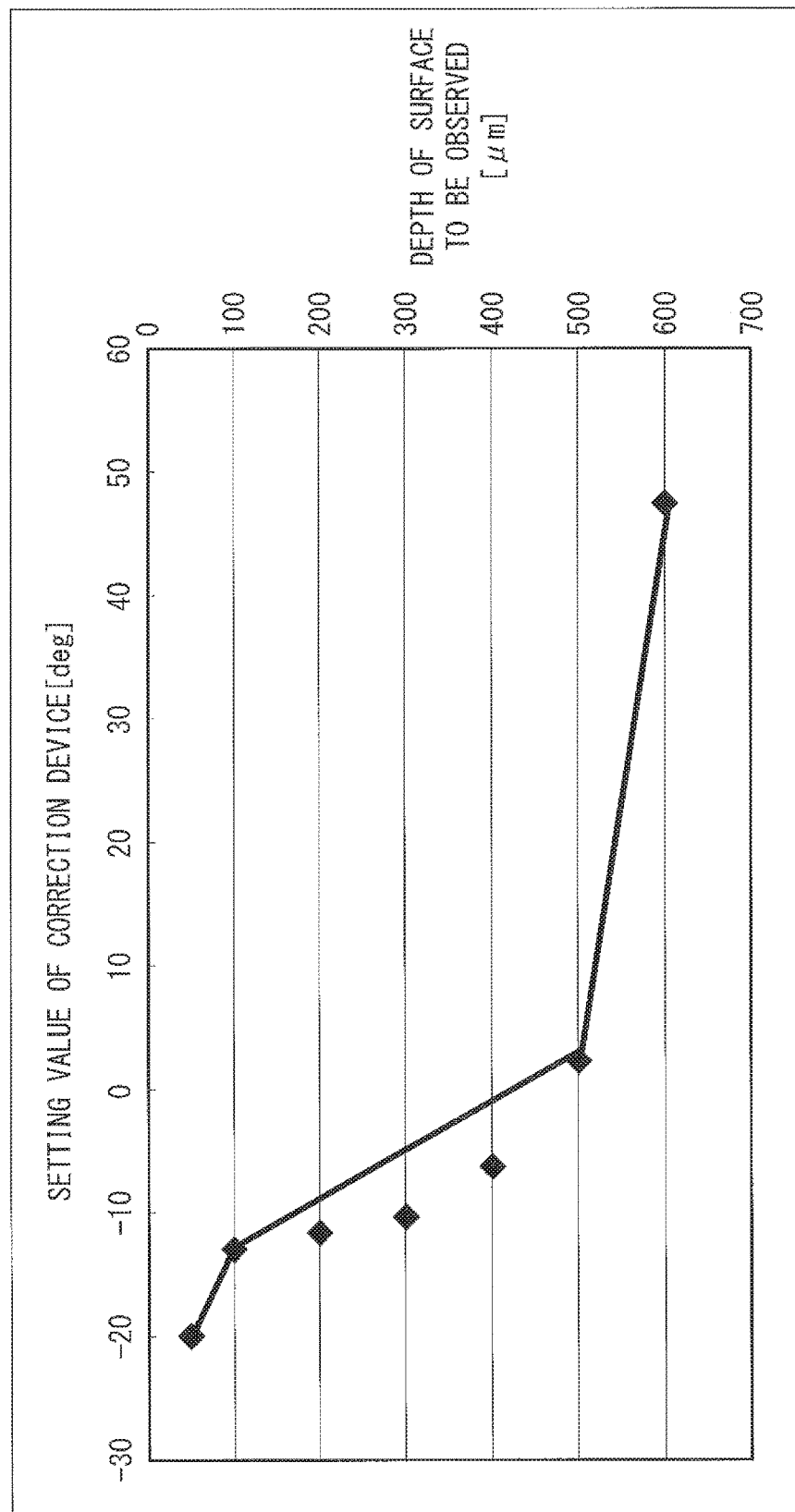
FIG. 11 illustrates an example of a total function calculated in the process of step S14 of FIG. 8.
Figure 12:
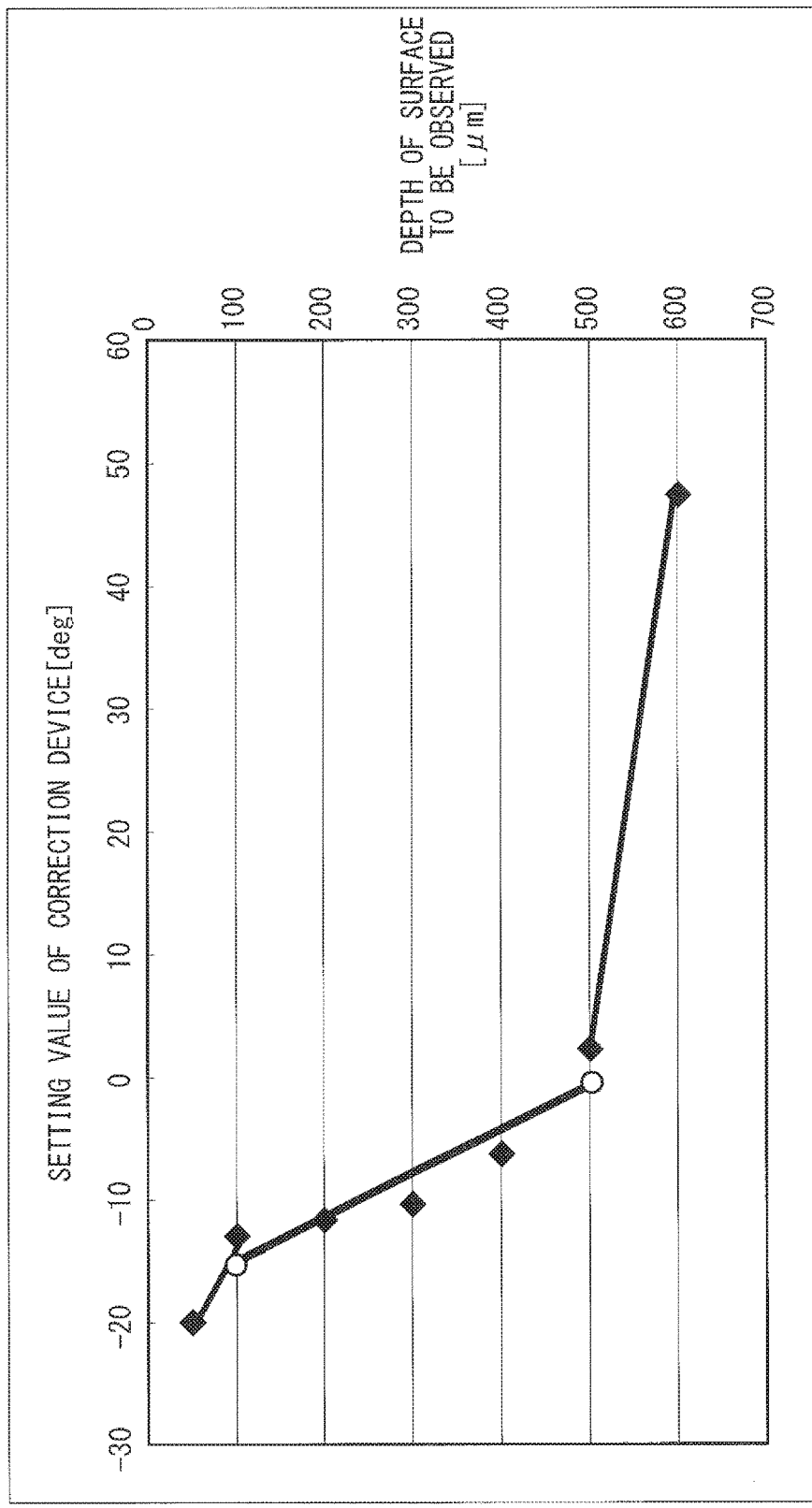
FIG. 12 illustrates another example of a total function calculated in the process of step S14 of FIG. 8.

FIG. 8 is a flowchart illustrating a specific example in which the process of step S8 of FIG. 4 is automated. FIG. 9 illustrates an inclination of a target value in a Z-position that is calculated in the process of step S11 of FIG. 8. FIG. 10 illustrates a plurality of Z-regions determined in the process of step S12 of FIG. 8. FIGS. 11-13 respectively illustrate examples of a total function calculated in the process of step S14 of FIG. 8.

The microscope system 1 calculates an inclination of a target value in a Z-position for each two adjacent Z-positions of a plurality of Z-positions in which the target value is calculated in step S5 (step S11). Here, the computing device 20 calculates the inclination of the target value in the Z-position on the basis of two Z-positions and two target values that are target values in the respective two Z-positions, for each two adjacent Z-positions of the plurality of Z-positions. FIG. 9 illustrates the inclination calculated in step S11. The horizontal axis represents a setting value (namely, a target value) of the correction collar 111 with which a spherical aberration is corrected. The vertical axis represents a depth of a surface to be observed, and corresponds to the Z-position of the objective 110 in one-to-one correspondence. The inclination depends on refractive indexes of a sample in two Z-positions, and as the refractive index of the sample becomes greater than a refractive index used as a reference in designing the objective 110 (hereinafter referred to as a "reference refractive index"), the absolute value of the inclination increases. This is because, as a difference between the reference refractive index and the refractive index of the sample increases, a larger spherical aberration is generated.

Then, the microscope system 1 determines a plurality of Z-regions (step S12). Here, the computing device 20 determines the plurality of Z-regions on the basis of a plurality of inclinations of the target value in the Z-position that are the inclinations of the target value in the Z-position calculated for each two Z-positions in step S11. More specifically, attention is focused on a change in the inclination. As an example, a Z-position in which an amount of change in the inclination is greater than or equal to a threshold may be specified, and a Z-region may be determined in such a way that the specified Z-position is located at a boundary. In a region (Z-region) with a small change in the inclination, the refractive index of the sample is considered to be almost constant. In a region (Z-region) with a large change in the inclination, the refractive index of the sample is considered to be greatly changed. By determining the Z-region with the Z-position having a large change in the inclination as a boundary, the Z-region can be determined for each almost homogenous region with a small change in the refractive index. FIG. 10 illustrates an example in which a Z-position that corresponds to a depth of a surface to be observed of 100

μm (hereinafter referred to as "Z100") and a Z-position that corresponds to a depth of the surface to be observed of 500 μm (hereinafter referred to as "Z500") are specified as a Z-position with a large change in the inclination so as to determine three Z-regions (the first Z-region, the second Z-region, and the three Z-region).

When a plurality of Z-regions are determined, the microscope system 1 calculates a partial function for each of the Z-regions (step S13). Here, the computing device 20 calculates, for each of the plurality of Z-regions determined in step S12, a partial function with each of the Z-regions as a domain indicating a relationship between a Z-position and a target value using interpolation or function approximation. FIG. 11 illustrates an example in which linear interpolation is performed on a target value at Z100 and a target value at Z500 so as to calculate a partial function with the second Z-region as a domain. FIG. 12 illustrates an example in which a partial function with the second Z-region as a domain is calculated with a least-squares method. FIG. 13 illustrates an example in which a partial function with the second Z-region as a domain is calculated with a function approximation of a quadratic function. All of FIGS. 11-13 illustrate an example in which, for the first Z-region and the third Z-region, a partial function is calculated with linear interpolation.

Finally, the microscope system 1 calculates a total function, which is a set of partial functions (step S14), and the process of FIG. 8 is finished.

The microscope system 1 can automatically calculate a function indicating the relationship between the Z-position and the target value by performing the processes illustrated in FIGS. 4 and 8. The microscope system 1 determines a Z-region for each almost homogenous region with a small change in the refractive index within the region of interest, and calculates a total function from partial functions calculated for the respective Z-regions. Therefore, even when the sample S has a structure in which a refractive index greatly varies according to a depth, a function for correcting a spherical aberration with a high accuracy can be calculated. This is preferable in particular when a sample such as the brain having a structure in which layers with different refractive indexes are stacked is used as a target. Thus, according to the microscope system 1, a function for correcting a spherical aberration with a high accuracy can be easily calculated.

Figure 14:
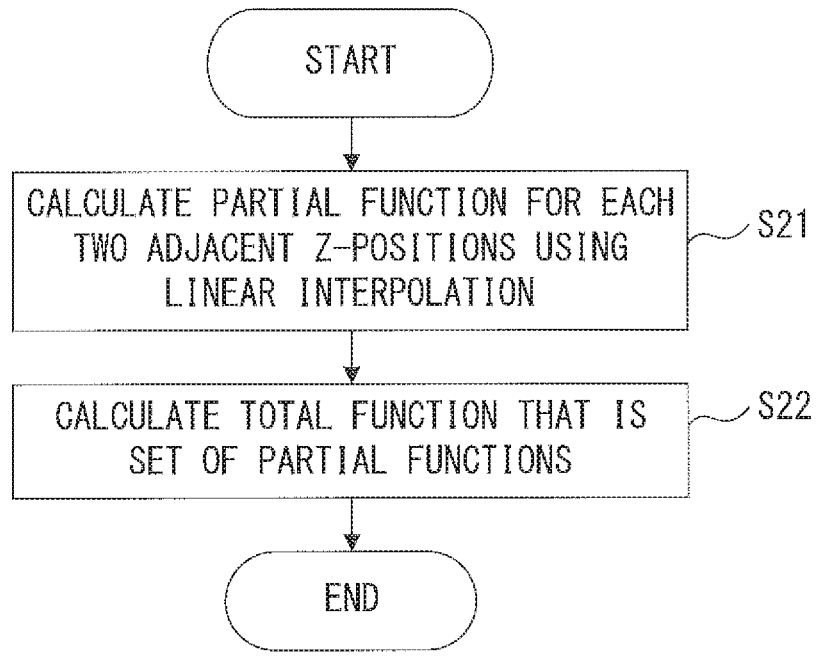
FIG. 14 is a flowchart illustrating another specific example in which the process of step S8 of FIG. 4 is automated.

FIG. 14 is a flowchart illustrating another specific example in which the process of step S8 of FIG. 4 is automated. The microscope system 1 may perform the process illustrated in FIG. 14 instead of the process illustrated in FIG. 8.

The microscope system 1 first calculates a partial function using linear interpolation for each two adjacent Z-positions of a plurality of Z-positions in which the target value has been calculated in step S5 (step S21). Here, the computing device 20 calculates a partial function with a Z-region having two adjacent Z-positions of the plurality of Z-positions at both ends as a domain, the partial function indicates the relationship between the Z-position and the target value using linear interpolation on the basis of the two Z-positions and two target values that are target values in the respective two Z-positions. This process is performed for each two adjacent Z-positions.

Then, the microscope system 1 calculates a total function that is a set of partial functions (step S22), and finishes the process of FIG. 14. FIG. 9 illustrates the function calculated as a result of the process of FIG. 14 indicating the relationship between the Z-position and the target value.

The process of FIG. 14 corresponds to the process of FIG. 8 in a case in which a region between each two adjacent Z-positions is determined to be a Z-region. Accordingly, the microscope system 1 can obtain an effect similar to the effect obtained by performing the processes of FIGS. 4 and 8 by performing the processes of FIGS. 4 and 14.

Figure 15:
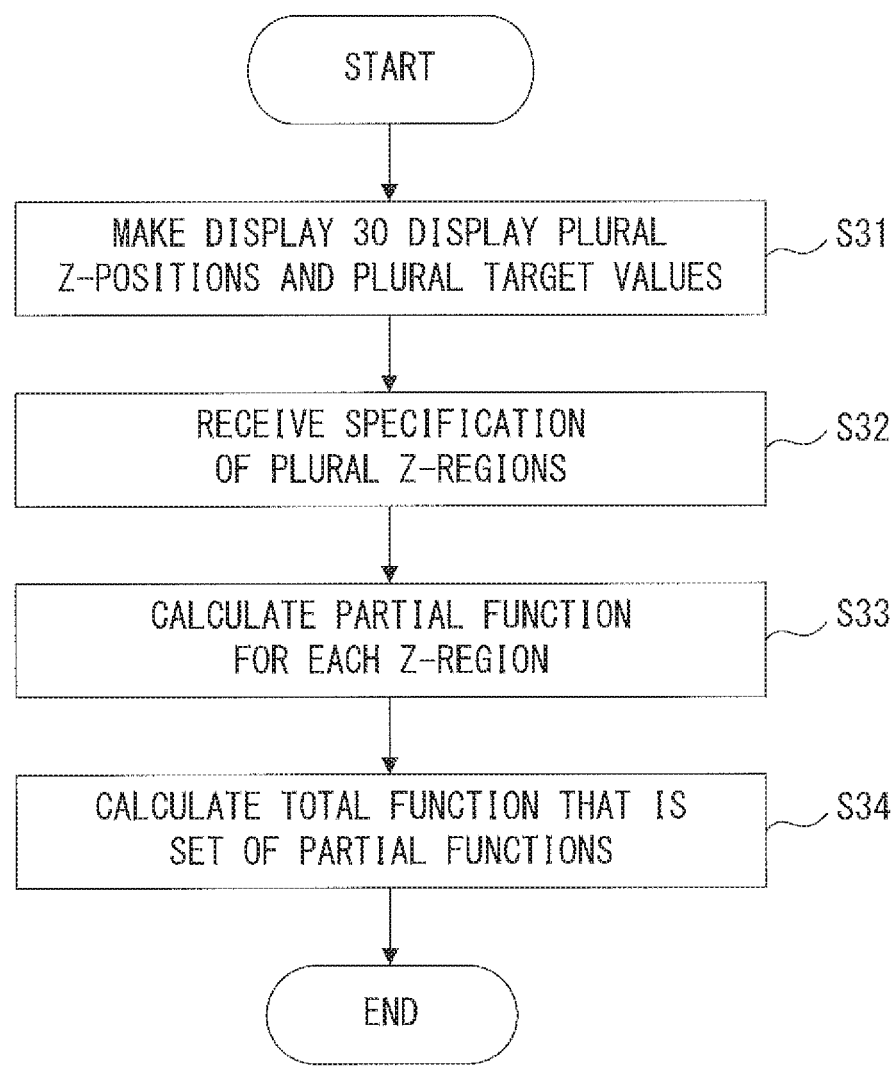
FIG. 15 is a flowchart illustrating a specific example in which the process of step S8 of FIG. 4 is semi-automated.
Figure 16:
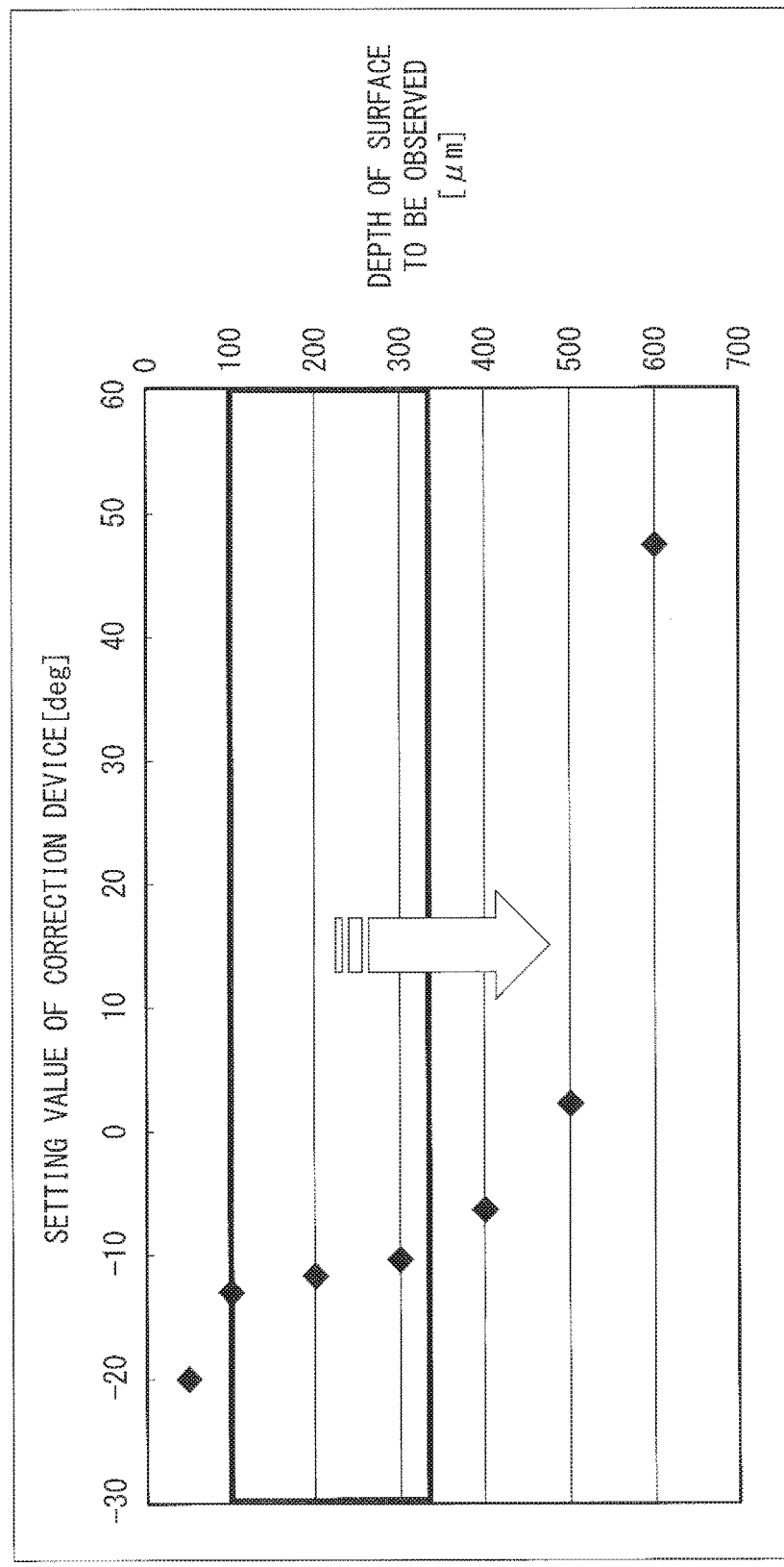
FIG. 16 is a diagram explaining a method for inputting specification of a Z-region that is received in step S32 of FIG. 15.

FIG. 15 is a flowchart illustrating a specific example in which the process of step S8 of FIG. 4 is semi-automated. FIG. 16 is a diagram explaining a method for inputting specification of a Z-region that is received in step S32 of FIG. 15. The microscope system 1 may perform the process of FIG. 15 instead of the process of FIG. 8.

The microscope system 1 first makes the display 30 display plural Z-positions in which the target value has been calculated in step S5 and the plural target values (step S31). Here, the computing device 20 (the output I/F device 24) makes the display 30 display plural Z-positions and plural target values that are target values in the respective plural Z-positions. FIG. 16 illustrates an example in which plural Z-positions and plural target values are displayed by plotting points each indicating a combination of the Z-position and the target value. A display method is not limited to the example of FIG. 16, and respective numerical values may be displayed, for example, in a tabular form.

Then, the microscope system 1 receives specification of a plurality of Z-regions (step S32). Here, as an example, a user that has confirmed information displayed in the display 30 in step S31 specifies a plurality of Z-regions by using the keyboard 40 or the like. FIG. 16 illustrates a state in which a Z-region is specified on a screen on which plural Z-positions and plural target values are displayed. When a plurality of Z-regions are specified, the computing device 20 receives information relating to the specified Z-regions.

Then, the microscope system 1 calculates a partial function for each of the Z-regions (step S33). Here, after the display 30 displays the plural Z-positions and the plural target values, the computing device 20 calculates, for each of the Z-regions specified in step S32, a partial function with the Z-region as a domain indicating the relationship between the Z-position and the target value using interpolation or function approximation.

Finally, the microscope system 1 calculates a total function that is a set of partial functions calculated in step S33 (step S34), and finishes the process of FIG. 15.

By performing the processes of FIGS. 4 and 15, the microscope system 1 can specify an almost homogenous region with a small change in a refractive index as a Z-region while a user is viewing information displayed in the display 30, even when it is difficult for the computing device 20 to perform automatic judgement. Thus, according to the microscope system 1, a function for correcting a spherical aberration with a high accuracy can be easily calculated.

Figure 17:
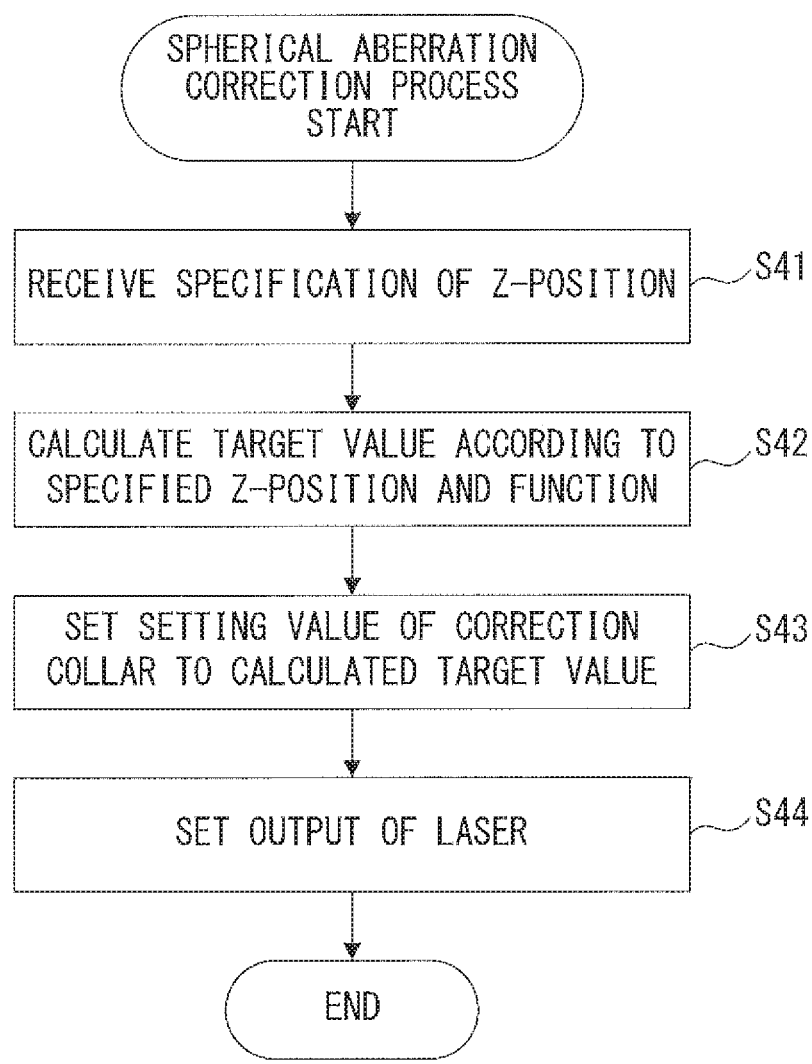
FIG. 17 is a flowchart of a spherical aberration correction process performed in a microscope system according to Embodiment 1 of the present invention.

FIG. 17 is a flowchart of a spherical aberration correction process performed in the microscope system 1 according to this embodiment. With reference to FIG. 17, a process of correcting a spherical aberration performed by using the correction collar 111 in the microscope system 1 is described below. The spherical aberration correction process illustrated in FIG. 17 is performed, for example, immediately before initiation of observation.

The microscope system 1 first receives specification of a Z-position (step S41). Here, for example, a user operates the Z drive unit operating device 60 to specify a Z-position, in order to determine a surface to be observed. As a result, the computing device 20 receives information relating to the specified Z-position from the Z drive unit operating device

60. The specified Z-position is a position within a Z-region specified by the region of interest. Further, the Z-controller 13 controls the Z drive unit 109 to change the Z-position of the objective 110 to the specified Z-position. As a result, a surface to be observed of the sample S is determined.

Next, the microscope system 1 calculates a target value on the basis of the Z-position specified in step S41 and the function calculated as a result of the function calculation process illustrated in FIG. 4 (step S42). Here, the computing device 20 calculates a target value in a current Z-position on the basis of the Z-position specified in step S41 (the current Z-position) and the function calculated as a result of the function calculation process illustrated in FIG. 4.

When the target value is calculated, the microscope system 1 sets the setting value of the correction collar 111 to the target value (step S43). Here, the correction collar controller 14 changes the setting value of the correction collar 111 to the target value calculated in step S42. The correction collar controller 14 may change the setting value of the correction collar 111 to the target value calculated in step S42 automatically, namely, in accordance with an instruction from the computing device 20. Alternatively, the correction collar controller 14 may change the setting value of the correction collar 111 to the target value manually, namely, by the target value calculated in step S42 being displayed in the display 30 and a user operating the correction collar operating device 50 according to the displayed target value. A user may directly operate the correction collar 111 so as to change the setting value of the correction collar 111 to the target value.

Finally, the microscope system 1 sets an output of the laser 101 (step S44). Here, the light source controller 11 controls the power of a laser beam applied to the sample S on the basis of image data obtained by a microscope apparatus when the setting value of the correction collar 111 is the target value. As an example, image data is obtained after the setting value of the correction collar 111 is changed in step S43, and the output of the laser 101 is set on the basis of brightness of an image calculated from the image data.

The microscope system 1 can easily correct a spherical aberration that varies according to a depth of a surface to be observed by performing the spherical aberration correction process illustrated in FIG. 17. This allows optical performance of the microscope 100 to be sufficiently exhibited so as to obtain a high-quality image. In addition, the microscope system 1 can calculate a target value in a current Z-position by performing simple calculation on the basis of a Z-position and a function. Therefore, even when the sample S is observed while observation depth is frequently changed, the setting value of the correction collar 111 can be changed to a target value according to the depth in a short time. Adjustment of the correction collar 111 can be automated, and therefore the adjustment can be easily incorporated into another automatic process such as a process of obtaining image data in a plurality of Z-positions so as to automatically generate a three-dimensional image or an extended focus image. Further, in a state in which a spherical aberration has been corrected, in general, a bright image can be obtained, compared with a state in which the spherical aberration has not been corrected. Therefore, by setting the output of the laser 101 on the basis of image data obtained in a state in which the spherical aberration has been corrected, the output of the laser 101 can be suppressed, and a damage to a biological sample can be suppressed.

Figure 19A:
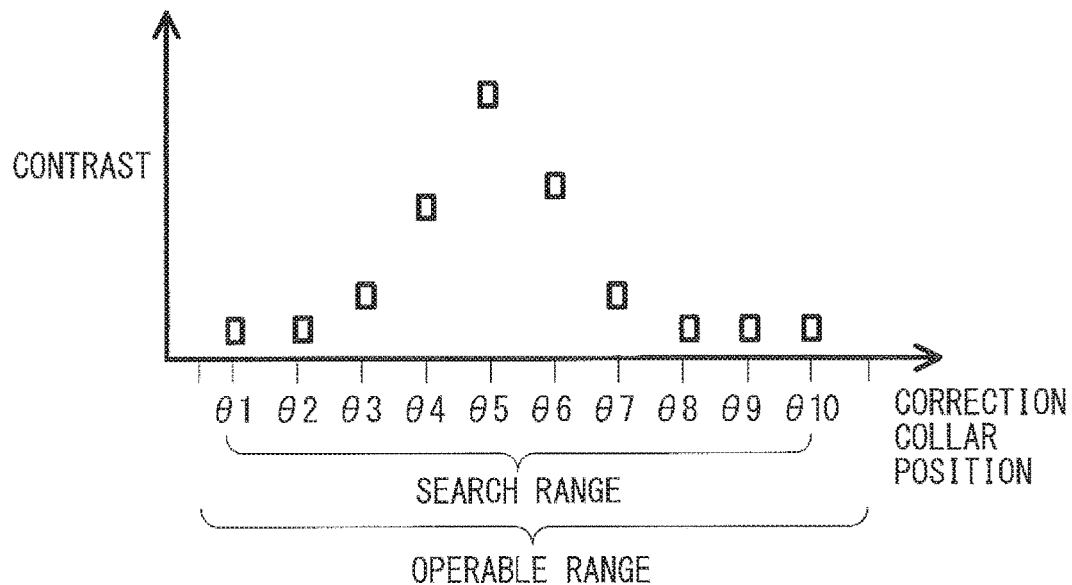
FIGS. 19A and 19B are diagrams explaining the target value calculation process illustrated in FIG. 18.
Figure 19B:
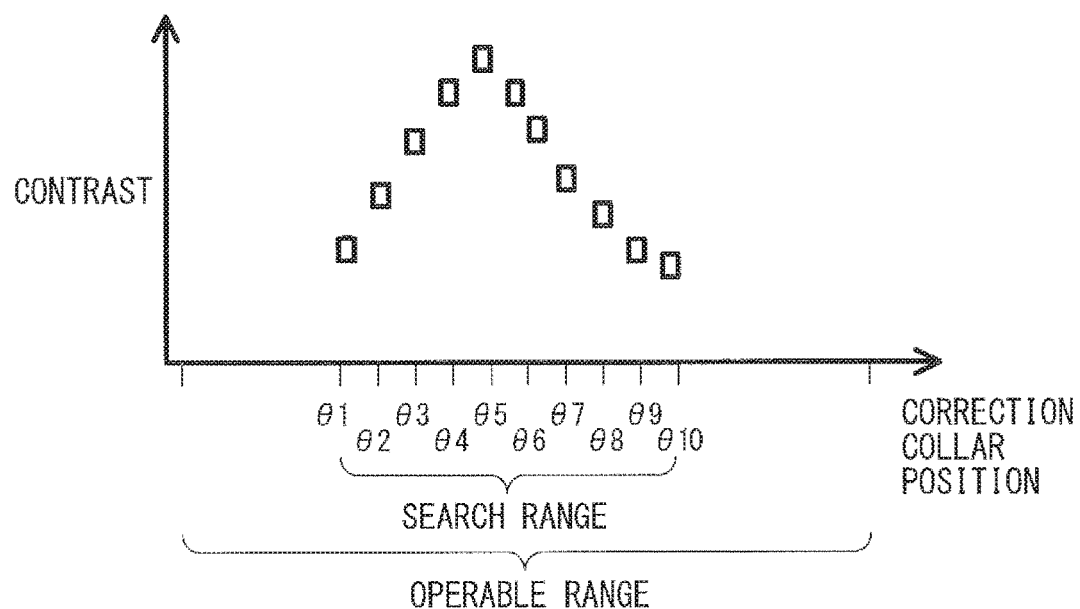

The target value calculation process performed in step S5 of the function calculation process illustrated in FIG. 4 is described below in detail. FIG. 18 is a flowchart of a target value calculation process performed for each Z-position in the microscope system 1. FIGS. 19A and 19B are diagrams explaining the target value calculation process illustrated in FIG. 18. The microscope system 1 first determines a plurality of setting values of the correction collar 111 (step S51). Here, the computing device 20 determines a plurality of setting values of the correction collar 111 in obtaining image data of a sample by using a microscope apparatus. As illustrated in FIG. 19A, for example, the computing device 20 determines a range in which the correction collar 111 is rotatable (an operable range) or a range that is a little smaller than the operable range to be a search range, and determines setting values (correction collar positions) of a predetermined number (in this example, 10) that is the number of sections into which the search range is equally divided to be the plurality of setting values. FIG. 19A illustrates an example in which 10 setting values (correction collar positions) $\theta 1$ to $\theta 10$, are determined.

Then, the microscope system 1 changes the setting value of the correction collar 111 to the setting value determined in step S51 (step S52). Here, the correction collar controller 14 sets the setting value of the correction collar 111 to be any one of the plurality of setting values determined in step S51 in accordance with an instruction from the computing device 20. As an example, the correction collar controller 14 changes the setting value of the correction collar 111 to $\theta 1$ determined in step S51.

When the setting value of the correction collar 111 is changed, the microscope system 1 obtains image data of the sample S (step S53). Here, the microscope apparatus obtains image data in accordance with an instruction from the computing device 20. As an example, the microscope apparatus obtains image data in a state in which the setting value of the correction collar 111 is $\theta 1$.

Then, the microscope system 1 determines whether image data has been obtained with all of the setting values determined in step S51 (step S54), and when image data has not been obtained with all of the setting values, the processes of step S52 to step S54 are repeated. By doing this, the microscope apparatus obtains image data of the surface to be observed of the sample S in a plurality of states having different setting values of the correction collar 111, and as a result, the microscope apparatus obtains plural pieces of image data.

When image data has been obtained with all of the setting values, the microscope system 1 calculates an evaluation value of each of the plural pieces of image data obtained in step S53 (step S55). Here, the computing device 20 calculates the evaluation value of the image data that shows a larger value as spherical aberration is corrected satisfactorily more, on the basis of each of the plural pieces of image data. As a result, the computing device 20 calculates a plurality of evaluation values of the plural pieces of image data. In general, image data in which spherical aberration has been corrected satisfactorily more has a higher contrast, and therefore, a contrast value that is calculated by performing a contrast evaluation method on image data is used for example for the evaluation value. FIG. 19A illustrates evaluation values of the plural pieces of image data obtained in step S53. In FIG. 19A, image data is specified by the correction collar position (the setting value of the correction collar 111), and an evaluation value of the image data is represented as a contrast value.

In the contrast evaluation method, the contrast value is calculated on the basis of a difference in a luminance value between pixels configuring image data. Specifically, a value obtained by integrating the square in the entirety of the image data of a difference in a luminance value between two pixels located in positions that deviate from each other in an x-direction by n pixels is calculated as the contrast value using the following expression, for example.

$$\sum_{y=1}^{H}\sum_{x=1}^{W-n}\{f(x, y) - f(x+n, y)\}^2$$

In this expression, x is a variable specifying a row of a pixel that configures image data, and y is a variable specifying a column of a pixel that configures image data. W is the number of pixels that configure image data in an x-direction (namely, the number of rows), and H is the number of pixels that configure image data in a y-direction (namely, the number of columns). f is a luminance value of a pixel, and n is an integer (for example, 5).

When the evaluation value is calculated, the microscope system 1 determines whether a prescribed condition is satisfied (step S56). The prescribed condition may be whether the number of repetitions of the processes of step S52 to step S56 reaches a prescribed number, or may be whether an average interval of a plurality of setting values is less than or equal to a prescribed value.

When the prescribed condition is not satisfied in step S56, the microscope system 1 determines new plural setting values (step S57), and repeats the processes of step S52 to step S56.

In step S57, the computing device 20 determines plural setting values so as to satisfy the following two conditions. The first condition is that a distribution range (namely, a search range) and an average interval of the plural setting values determined in step S57 is smaller than the distribution range and the average interval of the previous plural setting values. The second condition is that a setting value of the correction collar 111 that corresponds to a maximum evaluation value of the evaluation values calculated in step S55 is included within a distribution range of the plural setting values determined in step S57. In this description, it is assumed that the setting value that corresponds to the evaluation value refers to a setting value of a correction device when image data that corresponds to an evaluation value calculated from the image data is obtained. It is also assumed that the evaluation value that corresponds to the setting value refers to an evaluation value calculated from image data that corresponds to a setting value of a correction device when the image data is obtained.

As a result, the microscope apparatus repeats a process of obtaining plural pieces of image data in plural states having different setting values in such a way that a distribution range and an average interval of plural setting values of the correction collar 111 that are set in the plural states are narrowed in every repetition and that the setting value of the correction collar 111 that corresponds to a maximum evaluation value calculated by the computing device 20 is included within the distribution range. Then, the computing device 20 calculates plural evaluation values of plural pieces of image data for every repetition.

FIG. 19B illustrates evaluation values of plural pieces of image data obtained on the basis of the plural setting values determined in step S57. Comparing FIG. 19A and FIG. 19B, it is confirmed that the setting values (correction collar positions) illustrated in FIG. 19B satisfy the above two conditions. Both FIG. 19A and FIG. 19B illustrate an example in which 10 setting values (correction collar positions) are determined. However, the number of setting values is not limited to the same number if an average interval of setting values decreases in every repetition, and may increase or decrease.

When the prescribed condition is satisfied in step S56, the microscope system 1 calculates a target value on the basis of the plural evaluation values calculated in step S55 and the plural setting values that correspond to the plural evaluation values (step S58), and finishes the target value calculation process. Here, the computing device 20 may calculate, for example, a setting value of the correction collar 111 that corresponds to a maximum evaluation value of the plural evaluation values calculated in step S55 in the last repetition as the target value. Alternatively, the computing device 20 may calculate a setting value of the correction collar 111 that corresponds to a maximum evaluation value of the plural evaluation values calculated in step S55 in all of repetition that is not limited to the last repetition as the target value. Note that the computing device 20 stores a combination of the calculated target value and a current Z-position in the storage 25.

The microscope system 1 can calculate a target value with a high accuracy for a relatively small number of times of obtaining image data by performing the target value calculation process illustrated in FIG. 18.

An example in which an evaluation value is calculated for each piece of image data in step S55 of FIG. 18 has been described. However, the entire region of image data may be divided into plural regions, and an evaluation value (hereinafter referred to as a "region evaluation value" in order to distinguish this evaluation value from the evaluation value calculated for each piece of image data) may be calculated for each of the regions obtained by the division. In this case, in step S58, a target value is calculated for each of the regions (hereinafter referred to as a "region target value" in order to distinguish this target value from the target value calculated for the entire region), and a target value for the entire region is calculated on the basis of plural region target values.

Figure 20:
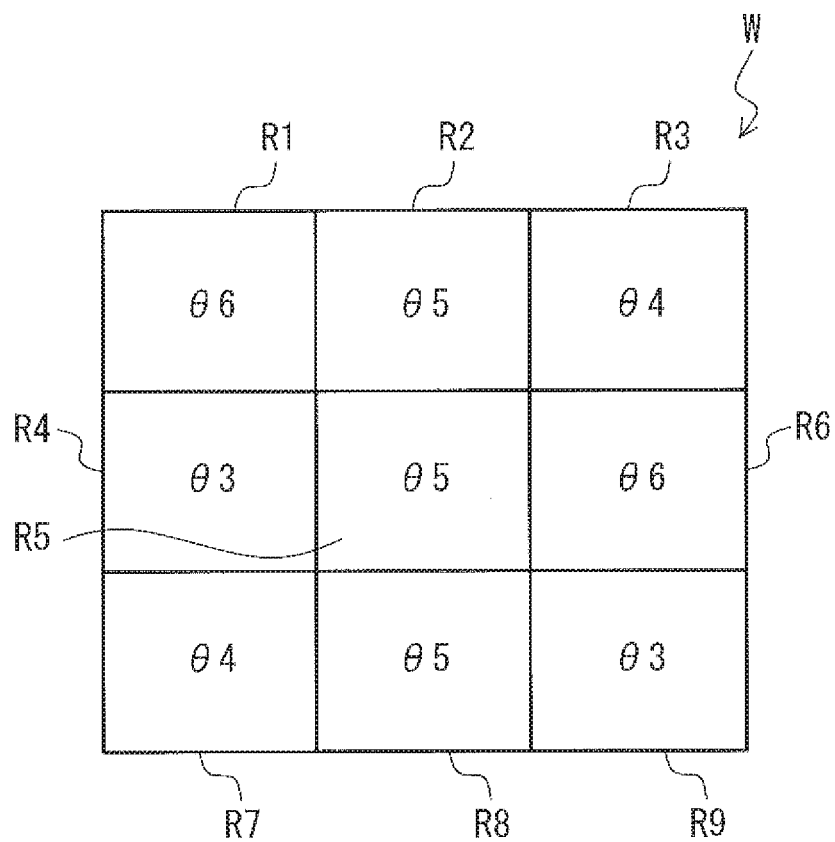
FIG. 20 illustrates an example in which the entire region of image data is divided into nine regions and a region target value is calculated for each of the regions.

FIG. 20 illustrates an example in which the entire region W of image data is divided into nine regions, regions R1 to R9, and a region target value is calculated for each of the regions. The target value for the entire region may be determined to be, for example, an intermediate value (θ5) of (θ3:θ3:θ4:θ4:θ5:θ5:θ5:θ6:θ6) obtained by arranging the region target values in ascending or descending order or may be determined to be the most frequent value (θ5). The number of divisions is not limited to 9, and may be a number that is less than or greater than 9.

A region target value is calculated for each of the regions, and a target value is calculated by performing a statistical process on the plural region target values. By doing this, even when pixel data with an extremely high or low luminance is included in image data, compared with the other pixel data, a contrast of the image data can be evaluated while suppressing the influence of the pixel data with an extremely high or low luminance. Therefore, a setting value with which a spherical aberration is corrected can be correctly calculated.

Figure 21:
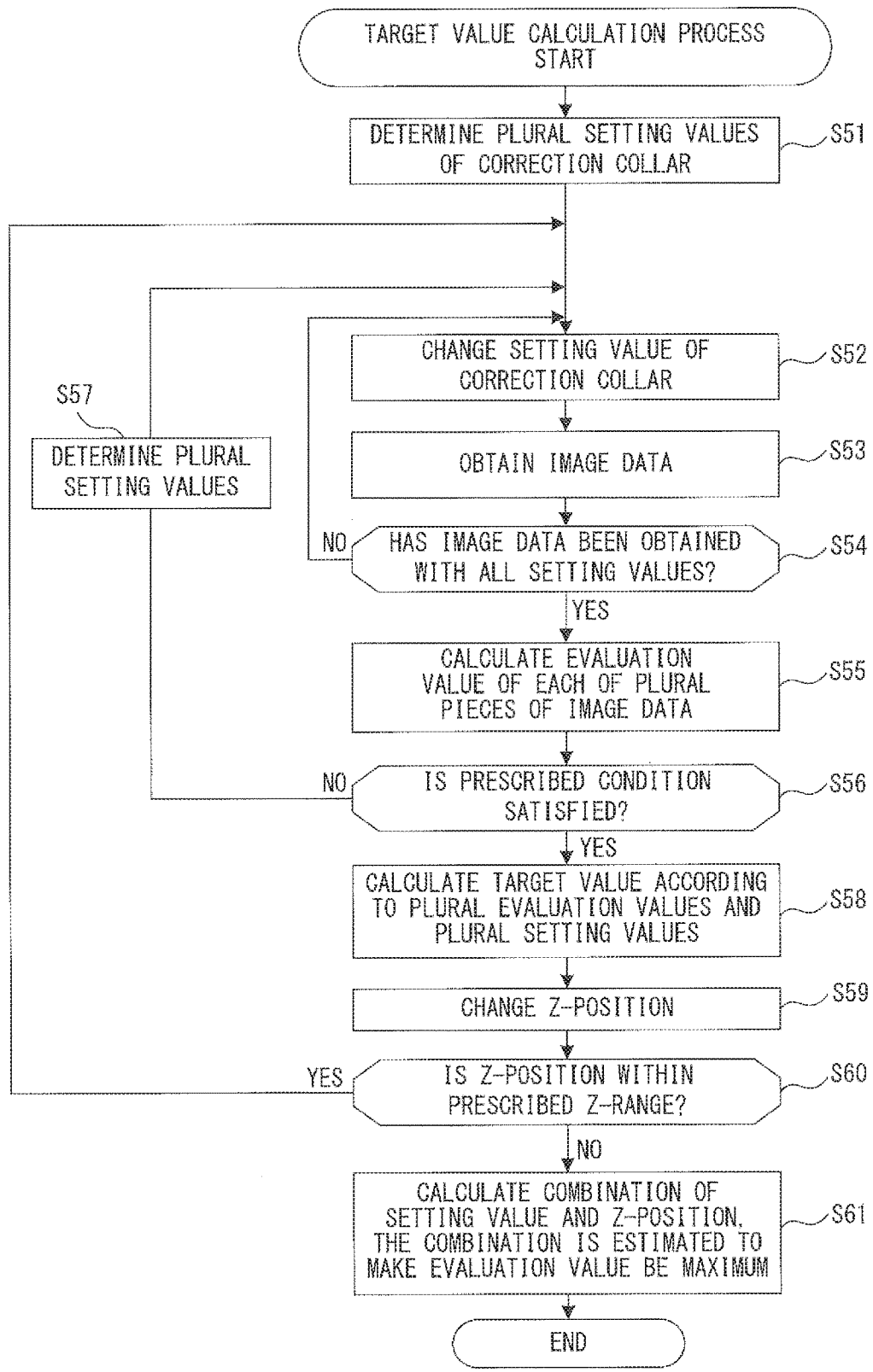
FIG. 21 is a flowchart of another target value calculation process performed in a microscope system according to Embodiment 1 of the present invention.

FIG. 21 is a flowchart of another target value calculation process performed in the microscope system 1. There are some objectives 110 for which a focal length slightly changes according to a change in the setting value of the correction collar 111. The target value calculation process illustrated in FIG. 21 is performed when such an objective 110 is used. The target value calculation process illustrated in FIG. 21 is different from the target value calculation process illustrated in FIG. 18 in that the processes of steps S59 to S61 are further performed after the process of step S58. The other points are similar to the target value calculation process illustrated in FIG. 18, and the description thereof is omitted.

When the target value is calculated in step S58, the microscope system 1 changes a Z-position (step S59). Here, the Z-controller 13 moves the Z drive unit 109 in the optical axis direction in accordance with an instruction of the computing device 20 so as to change the Z-position of the objective 110. A movement amount of the Z-position is a distance that is shorter than a maximum movement amount of a surface to be observed (namely, a maximum change amount of the focal length of the objective 110) that is generated when the setting value of the correction collar 111 is changed within the operable range.

Then, the microscope system 1 determines whether the changed Z-position is within a prescribed Z-region (step S60). Here, as an example, when an amount of deviation of the changed Z-position from a reference position (for example, the Z-position determined in step S4 or S7 of FIG. 4) is less than the maximum movement amount of the surface to be observed generated due to a change in the setting value of the correction collar 111, the computing device 20 determines that the Z-position is within a prescribed Z-region. Namely, the prescribed Z-region is, for example, a Z-region having double the width of a maximum change amount of the focal length of the objective 110 with the Z-position of the surface to be observed determined in step S4 or S7 as a center.

When the changed Z-position is within a prescribed Z-region, the microscope system 1 performs the processes of step S52 to step S58 in the changed Z-position. By doing this, the computing device 20 calculates a target value for each Z-position, and as a result, the computing device 20 calculates a plurality of target values in a plurality of Z-positions.

When the changed Z-position is outside a prescribed Z-region, the microscope system 1 calculates a combination of a setting value of the correction collar 111 and a Z-position, on the basis of the plurality of target values in the plurality of Z-positions and evaluation values that correspond to the plurality of target values (step S61). The combination is a combination with which an evaluation value is estimated to become maximum. Then, the microscope system 1 finishes the target value calculation process. Here, the computing device 20 specifies, for example, a maximum evaluation value of the plurality of evaluation values that correspond to the plurality of target values, and calculates a target value that corresponds to the maximum evaluation value as a setting value with which the evaluation value is estimated to become maximum. Then, the computing device 20 stores the combination of the setting value and the Z-position with which the evaluation value is estimated to become maximum in the storage 25.

The microscope system 1 performs the target value calculation process illustrated in FIG. 21. By doing this, even when the focal length of the objective 110 varies according to the setting value of the correction collar 111, a combination of the setting value of the correction collar 111 for satisfactorily correcting a spherical aberration and the Z-position of the objective 110 can be calculated with a high accuracy for a relatively small number of times of obtaining image data. According to the combination of the setting value and the Z-position calculated in step S61, the Z-controller 13 and the correction collar controller 14 control the Z drive unit 109 and the correction collar 111. This allows a spherical aberration generated on the surface to be observed to be corrected satisfactorily.

In step S55 of FIG. 22, the entire region of image data may be divided into a plurality of regions, and a region evaluation value may be calculated for each of the plurality of regions. In this case, in step S58, a plurality of region target values are calculated. In step S61, the combination of the setting value of the correction collar 111 and the Z-position with which an evaluation value is estimated to become maximum (hereinafter referred to as a "region combination" in order to distinguish this combination from a combination calculated for the entire region) is calculated for each of the plurality of regions on the basis of a plurality of region target values in a plurality of Z-positions and region evaluation values that correspond to the plurality of region target values. Then, a combination for the entire region is calculated on the basis of the plurality of region combination.

FIG. 22 illustrates an example in which the entire region W of image data is divided into nine regions, regions R1-R9, and a region combination is calculated for each of the regions. A setting value that is an element of a region combination may be determined to be, for example, an intermediate value ($\theta 4.5$) of ($\theta 3.6$:$\theta 3.7$:$\theta 4.4$:$\theta 4.4$:$\theta 4.5$:$\theta 4.6$:$\theta 4.7$:$\theta 5.1$:$\theta 6.1$) that is obtained by arranging the region target values calculated in step S58 in ascending or descending order, or may be determined to be the most frequent value ($\theta 4.4$). A Z-position that is an element of the region combination may be determined on the basis of, for example, the determined setting value. When the setting value is the intermediate value ($\theta 4.5$), the Z-position may be determined to be the value (Z2.5) of a Z-position that corresponds to the intermediate value, and when the setting value is the most frequent value ($\theta 4.4$), the Z-position may be determined to be the value (Z2.3) of a Z-position that corresponds to the most frequent value. The number of divisions is not limited to 9, and may be less than or greater than 9.

A region combination is calculated for each of the regions, and a combination of the setting value of the correction collar 111 and the Z-position with which the evaluation value is estimated to become maximum is calculated in a statistical process on the plurality of regional combinations. By doing this, even when pixel data having an extremely high or low luminance is included in image data, compared with the other pixel data, the influence of the pixel data having an extremely high or low luminance can be suppressed so as to evaluate a contrast of image data. Therefore, a setting value for correcting a spherical aberration can be correctly calculated.

Figure 23:
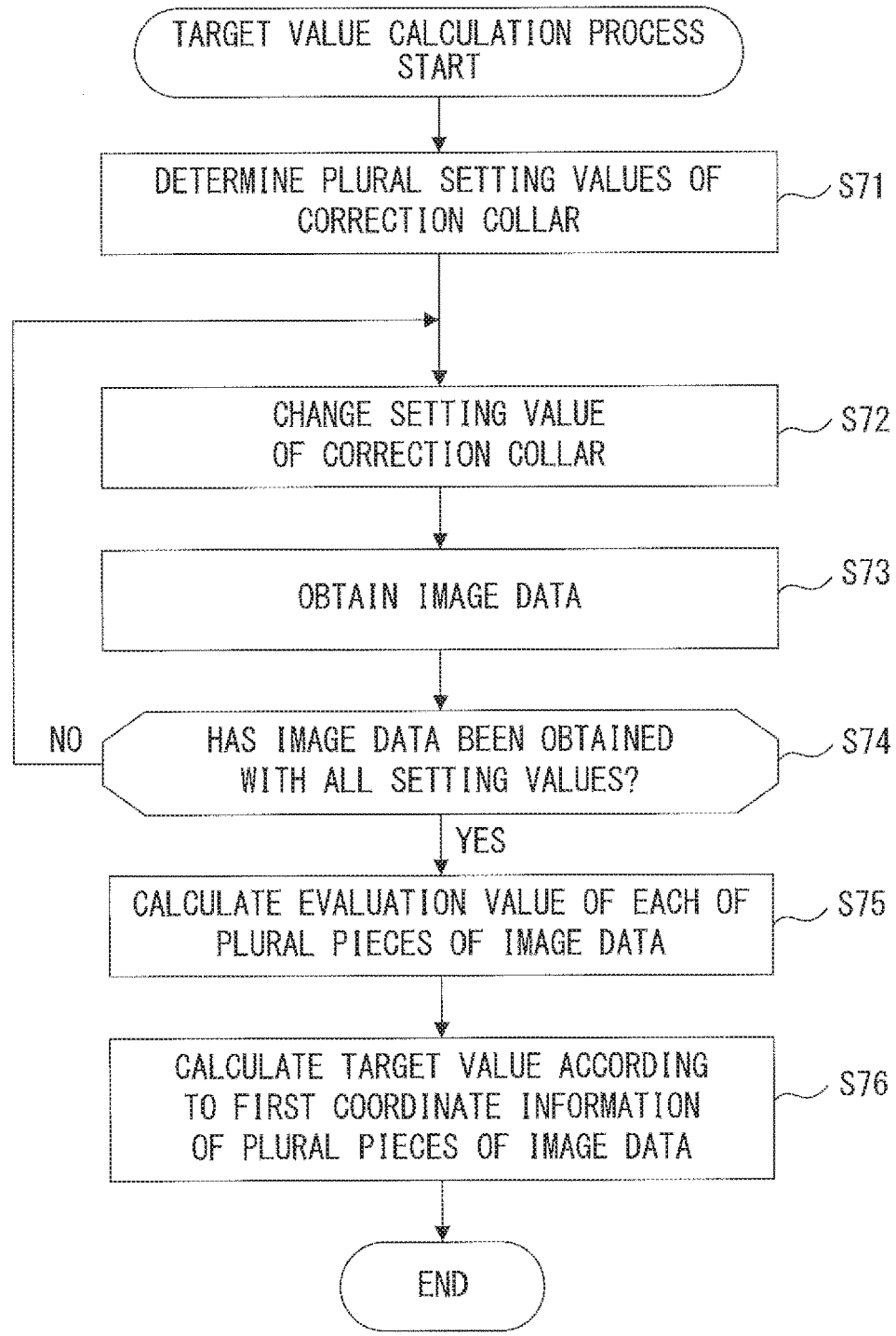
FIG. 23 is a flowchart of yet another target value calculation process performed in a microscope system according to Embodiment 1 of the present invention.

FIG. 23 is a flowchart of yet another target value calculation process performed in the microscope system 1. FIG. 24 is a diagram explaining the target value calculation process illustrated in FIG. 23. With reference to FIGS. 23 and 24, the target value calculation process illustrated in FIG. 23 is described. The processes of step S71 to step S75 of FIG. 23 are similar to the processes of step S51 to step S55 of FIG. 18, and the detailed description is omitted.

When the evaluation value is calculated in step S75, the microscope system 1 calculates a target value on the basis of the first coordinate information of plural pieces of image data (step S76), and finishes the target value calculation process. It is assumed that the first coordinate information of image data refers to a combination of an evaluation value calculated from the image data and a setting value of the correction collar 111 that corresponds to the evaluation value.

In step S76, the computing device 20 first selects three or more pieces of image data from the plural pieces of image data obtained in step S73. The three or more pieces of image data are selected so as to include image data for which a maximum evaluation value of the plurality of evaluation values calculated in step S75 is calculated.

Then, the computing device 20 calculates a target value that is a setting value of the correction collar 111 for correcting a spherical aberration on a surface to be observed, on the basis of the first coordinate information of the three or more selected pieces of image data. Specifically, the computing device 20 calculates a function using interpolation or function approximation on the basis of the first coordinate information of the three or more pieces of image data. The function is a function relating to an evaluation value and a setting value. A setting value obtained from peak coordinates (coordinates on which the evaluation value becomes maximum) of the calculated function is calculated as the target value. The computing device 20 stores a combination of the calculated target value and a current Z-position in the storage 25.

FIG. 24 illustrates an example in which three pieces of image data that include image data for which a maximum evaluation value is calculated and pieces of image data before and after the image data (namely, pieces of image data having close setting values) are selected. FIG. 24 also illustrates an example in which a quadratic function is calculated from three pieces of first coordinate information obtained from the three pieces of image data with Lagrangian interpolation and a target value is calculated from peak coordinates of the quadratic function. Arbitrary interpolation such as Lagrangian interpolation or spline interpolation may be employed for interpolation. Further, arbitrary approximation such as a least-squares method may be employed for function approximation.

The microscope system 1 can calculate a target value with a high accuracy for a relatively small number of times of obtaining image data by performing the target value calculation process illustrated in FIG. 23.

A target value may be calculated by performing a combination of the target value calculation process illustrated in FIG. 18 and the target value calculation process illustrated in FIG. 23. As an example, by adding the processes of step S56 and step S57 of FIG. 18 to the target value calculation process illustrated in FIG. 23, calculation of a target value may be repeated while gradually narrowing a distribution range (namely, a search range) and an average interval of a plurality of setting values in such a way that the target value calculated in step S76 is included within the distribution range. This allows the target value to be calculated with a higher accuracy.

Figure 25:
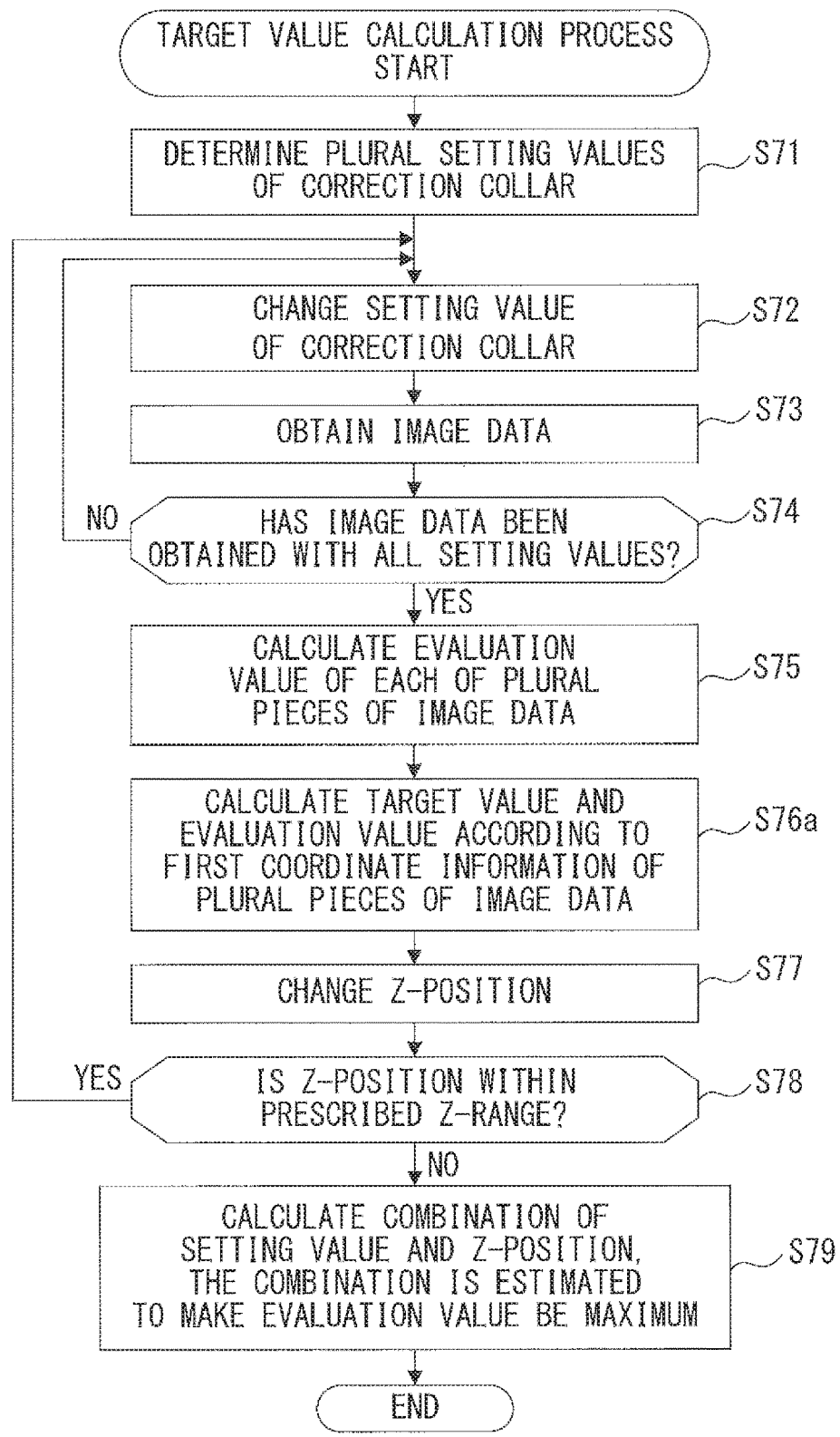
FIG. 25 is a flowchart of yet another target value calculation process performed in a microscope system according to Embodiment 1 of the present invention.
Figure 26:
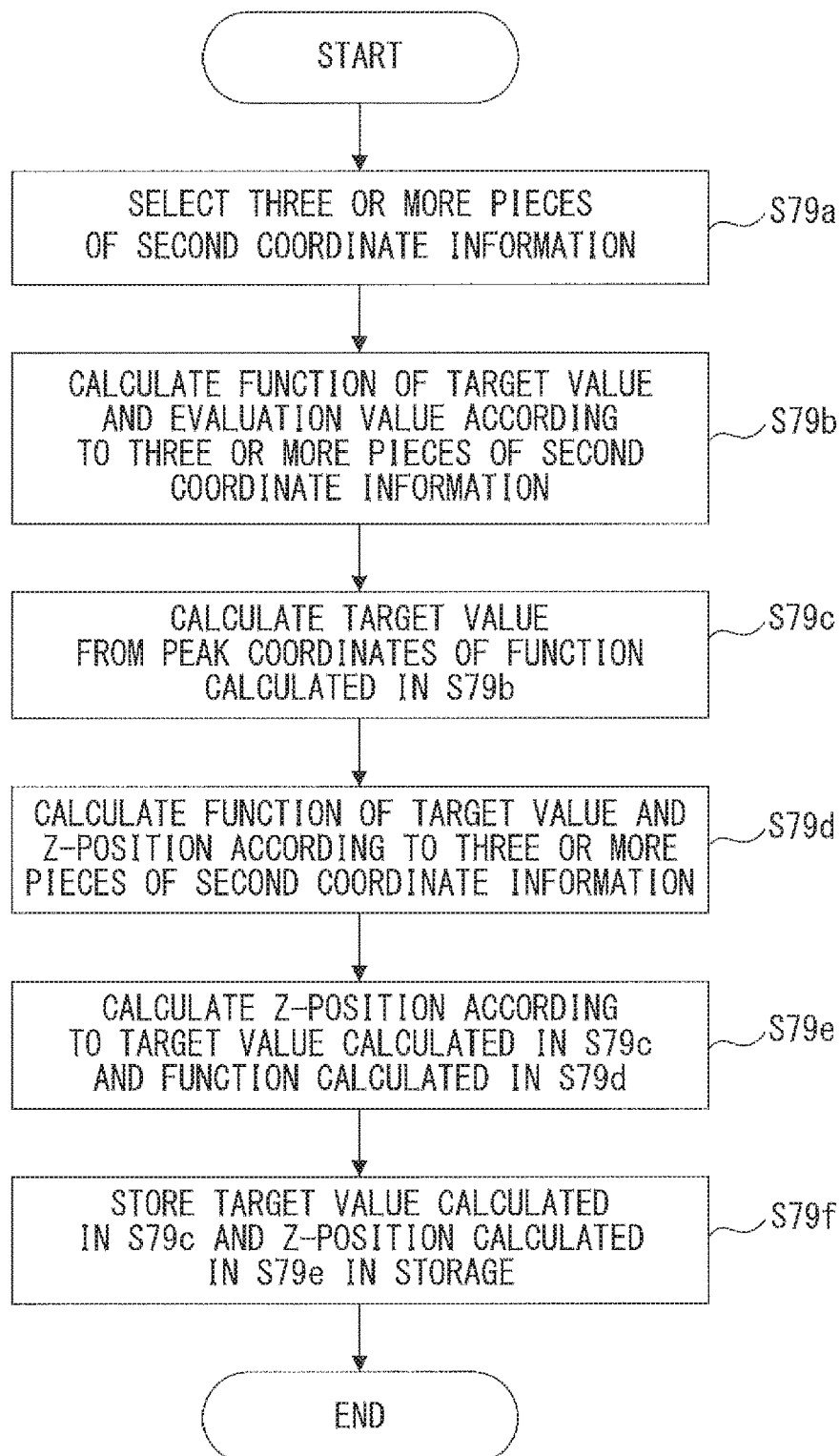
FIG. 26 is a flowchart of the process of step S79 of the target value calculation process illustrated in FIG. 25.

FIG. 25 is a flowchart of yet another target value calculation process performed in the microscope system 1. FIG. 26 is a flowchart of the process of step S79 of the target value calculation process illustrated in FIG. 25. FIGS. 27 and 28 are diagrams explaining the process illustrated in FIG. 26. FIG. 27 illustrates a method for calculating a function of a target value and an evaluation value, and FIG. 28 illustrates a method for calculating a function of a target value and a Z-position. The target value calculation process illustrated in FIG. 25 is performed when the objective 110 for which a focal length is changed according to a change in the setting value of the correction collar 111 is used. The target value calculation process illustrated in FIG. 25 is different from the target value calculation process illustrated in FIG. 23 in that the process of step S76a is performed instead of the process of step S76 and that the processes of step S77 to step S79 are further performed. In the other respects, the target value calculation process illustrated in FIG. 25 is similar to the target value calculation process illustrated in FIG. 23, and the description thereof is omitted. The process of step S76a is different from the process of step S76 in that an evaluation value that corresponds to a target value, in addition to the target value, is calculated from peak coordinates of a function.

When the target value and the evaluation value are calculated in step S76a, the microscope system 1 changes the Z-position (step S77). The microscope system 1 further determines whether the changed Z-position is within a prescribed Z-region (step S78). The processes of step S77 and step S78 are similar to the processes of step S59 and step S60 in FIG. 20.

When the changed Z-position is within a prescribed Z-region, the microscope system 1 performs the processes of step S72 to step S76a in the changed Z-position. By doing this, a target value and an evaluation value that corresponds to the target value are calculated for each Z-position, and consequently, a plurality of target values and a plurality of evaluation values in a plurality of Z-positions are calculated. Namely, plural pieces of second coordinate information are calculated. It is assumed that the second coordinate information refers to a combination of a Z-position, a target value in the Z-position, and an evaluation value that corresponds to the target value in the Z-position.

When the changed Z-position is not within a prescribed Z-region, the microscope system 1 calculates a combination of a setting value and a Z-position with which an evaluation value is estimated to become maximum on the basis of the plural pieces of second coordinate information (step S79), and finishes the target value calculation process. Here, the computing device 20 first selects three or more pieces of second coordinate information from the plural pieces of second coordinate information, as illustrated in FIG. 26 (step S79a). The three or more pieces of second coordinate information are selected so as to include second coordinate information having a maximum evaluation value among the plural pieces of second coordinate information. Then, the computing device 20 calculates a function of a target value and an evaluation value (a broken line in FIG. 27) with interpolation or function approximation on the basis of the three or more selected pieces of second coordinate information (step S79b). At this time, information relating to a Z-position included in the second coordinate information is not used to calculate the function. Next, the computing device 20 calculates a target value on peak coordinates (coordinates on which an evaluation value becomes maximum) from the peak coordinates of the function calculated in step S79b (step S79c). Further, the computing device 20 calculates a function of a target value and a Z-position (a broken line in FIG. 28) with linear interpolation on the basis of the three or more selected pieces of second coordinate information (step S79d). At this time, information relating to an evaluation value included in the second coordinate information is not used to calculate the function. Then, the computing device 20 calculates a Z-position on the basis of the target value calculated in step S79c and the function calculated in step S79d (step S79e). Finally, the computing device 20 calculates a combination of the target value calculated in step S79c and the Z-position calculated in step S79e as a combination of a setting value and a Z-position with which an evaluation value is estimated to become maximum, and stores the combination in the storage 25 (step S79f). Also in step S61 of FIG. 21, the combination may be calculated in a similar method.

The microscope system 1 performs the target value calculation process illustrated in FIG. 25. By doing this, even when the focal length of the objective 110 varies according to the setting value of the correction collar 111, a combination of the setting value of the correction collar 111 and the Z-position of the objective 110 for satisfactorily correcting a spherical aberration can be calculated with a high accuracy for a relatively small number of times of obtaining image data. Then, according to the combination of the setting value and the Z-position calculated in step S79, the Z-controller 13 and the correction collar controller 14 control the Z drive unit 109 and the correction collar 111 so as to be able to satisfactorily correct a spherical aberration generated on a surface to be observed.

FIG. 25 illustrates an example in which the processes of step S72 to step S76a are performed in each of the Z-positions within a prescribed Z-region, but the process of step S71 is further performed in each of the Z-positions. Namely, a plurality of setting values of the correction collar 111 (a range of setting values of the correction collar with which image data is obtained) may be redetermined for each of the Z-positions.

Figure 29:
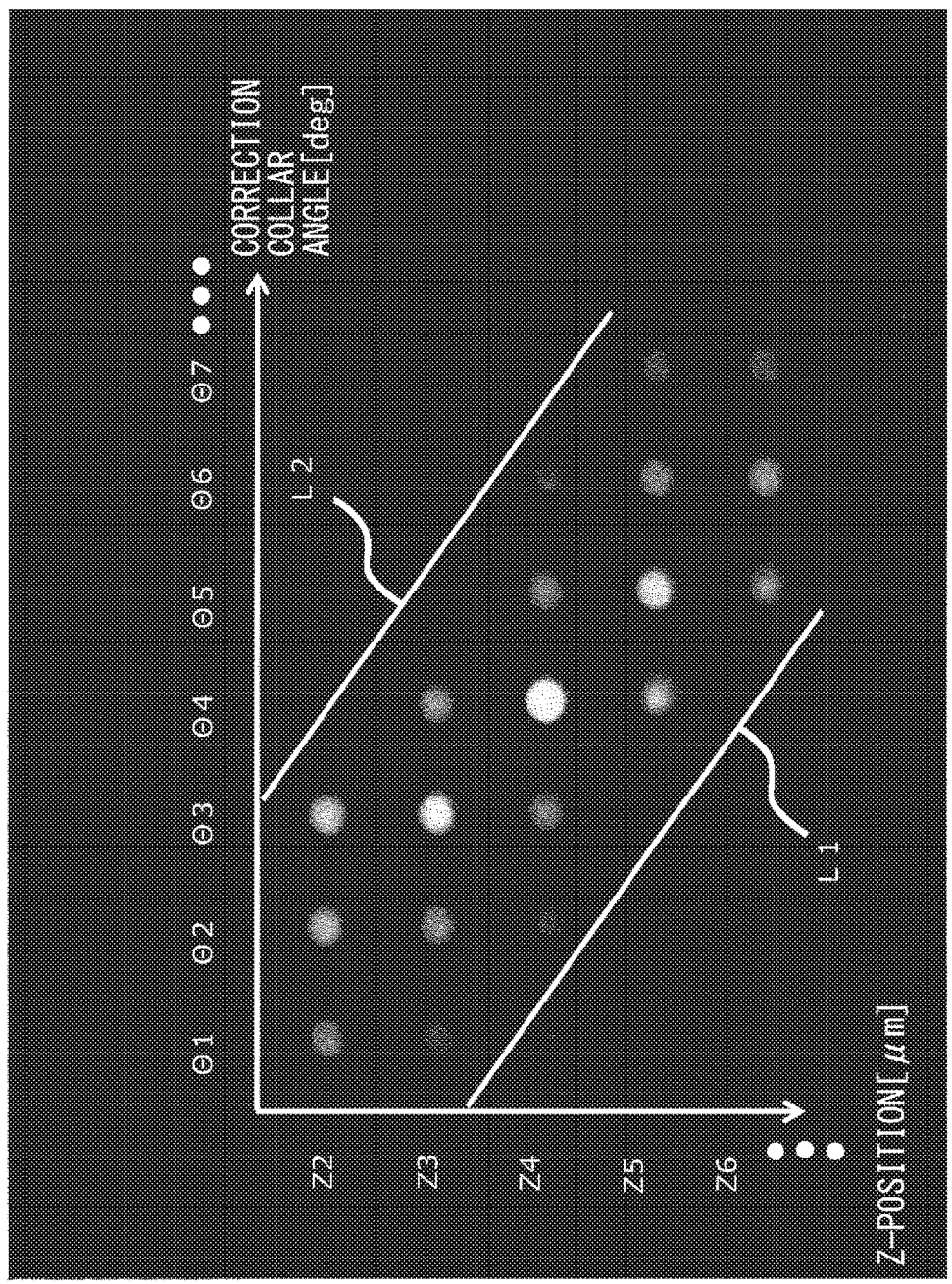
FIG. 29 is a diagram in which images of a sample obtained in each Z-position using each setting value of a correction collar are arranged.

FIG. 29 is a diagram in which images of the sample S obtained in respective Z-positions with respective setting values (angles) of the correction collar 111 are arranged. FIG. 29 shows a tendency wherein, as the Z-position becomes deeper, the setting value (for example, a target value) of the correction collar 111 with which a high-contrast image can be obtained also increases. Accordingly, when this tendency of the target value with respect to the Z-position is known, a search range may be determined for each of the Z-positions according to information of this tendency (hereinafter referred to as "tendency information"), and a plurality of setting values may be determined within the search range in step S71. The tendency information is stored in the storage 25, for example, for each of the Z-positions. Specific content of the tendency information may be, for example, information relating to a range of a setting value to be searched in order to calculate a target value (hereinafter referred to as a "recommended search range" or "recommended distribution range"), and the recommended search range may be set for each objective on the basis of the design value of the objective. The specific content of the tendency information may also be information relating to a setting value of a correction collar and an evaluation value in a Z-position of the objective (for example, information relating to a combination of the Z-position of the objective, the setting value of the correction collar, and the evaluation value, or information indicating a relationship among them). In the example illustrated in FIG. 29, three setting values θ1-θ3 are determined in Z2, five setting values θ1-θ5 are determined in Z3, and five setting values θ2-θ6 are determined in Z4. This allows the search range to be narrowed, compared with a case in which a plurality of setting values are not redetermined for each of the Z-positions, and therefore the number of setting values determined in step S71 can decrease. Therefore, a combination of the setting value of the correction collar 111 and the Z-position of the objective 110 for satisfactorily correcting a spherical aberration can be calculated with a high accuracy for a smaller number of times of obtaining image data.

A width of the search range (a distance in a θ-direction between L1 and L2) may be set for each objective on the basis of, for example, the design value of the objective and the like, or data as illustrated in FIG. 29 may be obtained in advance in an experiment or the like, and the width of the search range may be set on the basis of the data. The tendency described above (namely, a tendency indicating a relationship among the Z-position, the evaluation value, and the setting value; for example, inclinations of L1 and L2) may be calculated from information of a combination of a Z-position and a target value calculated in a first several changes in the Z-position.

FIGS. 21 and 25 illustrate an example in which a Z-position is changed to the next position after image data is obtained without changing the Z-position by using all of the setting values of the correction collar 111 that are determined. However, any method may be employed if image data obtained in respective states having different setting values can eventually be obtained for each of the Z-positions within a prescribed region. Therefore, the setting value of the correction collar 111 may be changed to the next setting value after image data is obtained for each of the Z-positions within a prescribed region without changing the setting value of the correction collar 111.

Embodiment 2

Figure 30:
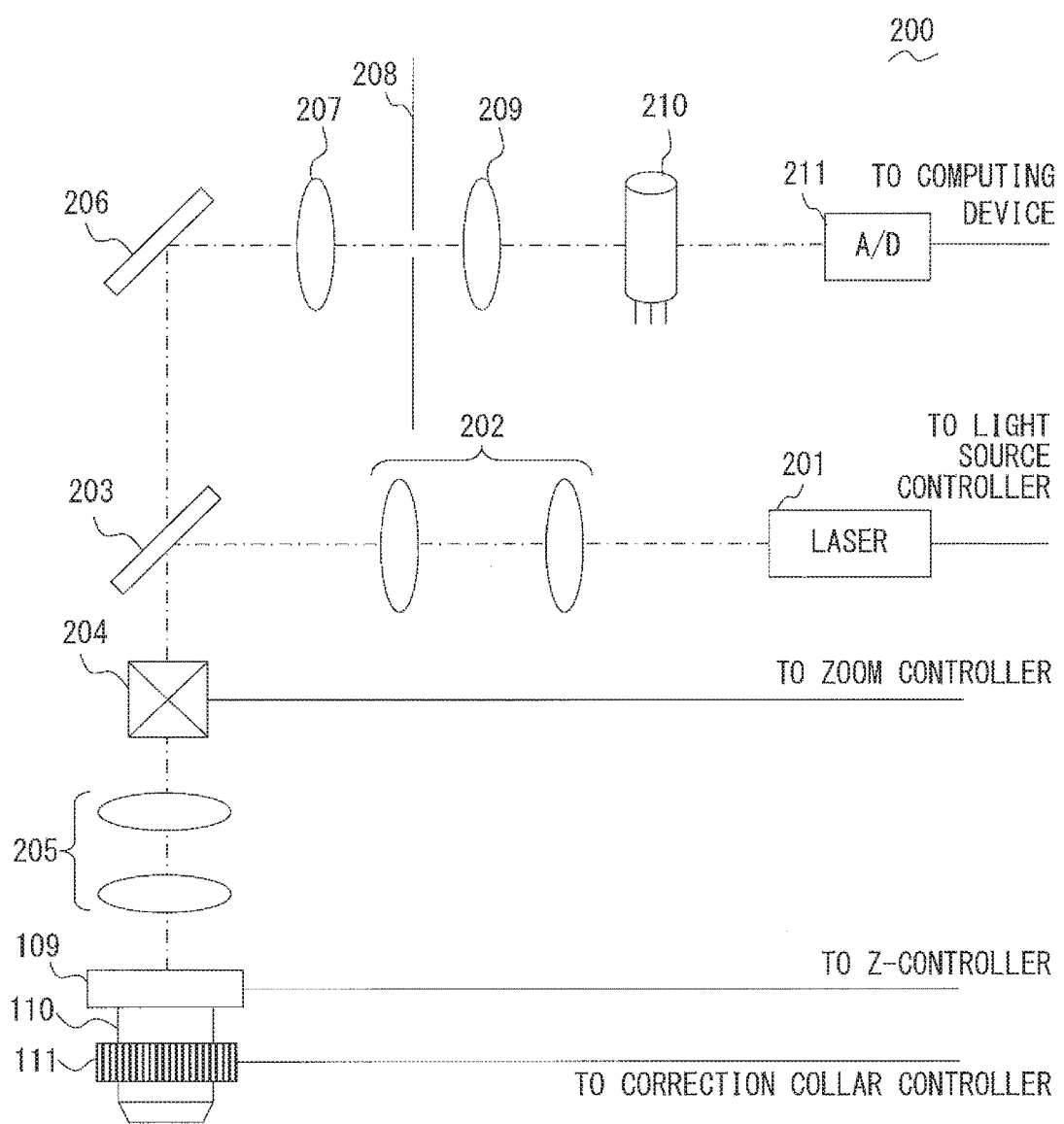
FIG. 30 illustrates a configuration of a microscope according to Embodiment 2 of the present invention.

FIG. 30 illustrates a configuration of a microscope 200 according to this embodiment. A microscope system according to this embodiment is different from the microscope system 1 illustrated in FIG. 1 in that the microscope 200 is included instead of the microscope 100. In the other respects, the microscope system according to this embodiment is similar to the microscope system 1, and therefore the same components are denoted by the same reference numerals.

The microscope 200 is a confocal microscope. A sample S is a biological sample such as the brain of a mouse. The microscope 200 includes a laser 201, a beam expander 202, a dichroic mirror 203, a scanning unit 204, a pupil projection optical system 205, and an objective 110 on an illumination light path, as illustrated in FIG. 30. In the microscope 200, an objective 110, a Z drive unit 109 that moves the objective 110 in the optical axis direction, and a correction collar 111 that is a correction device that moves a lens in the objective 110 so as to correct a spherical aberration are similar to those in the microscope 100 according to Embodiment 1.

The laser 201 oscillates a laser beam, for example, in a visible range, an ultraviolet region, and a near-infrared region. An output of a laser beam oscillated from the laser 201 is controlled by a light source controller 11. The beam expander 202 is an optical system that adjusts a flux of the laser beam (collimate light) from the laser 201 according to a pupil diameter of an objective 110. The dichroic mirror 203 is a beam splitter that splits excitation light (a laser beam) and detection light (fluorescence) from the sample S, and splits the laser beam and the fluorescence according to a wavelength.

The scanning unit 204 is a scanner that two-dimensionally scans the sample S with the laser beam, and includes, for example, a galvano-scanner, a resonant scanner, and the like. As a scan field of the scanning unit 204 is changed, a zoom magnification is changed. The scan field of the scanning unit 204 is controlled by the zoom controller 12. The pupil projection optical system 205 is an optical system that projects the scanning unit 204 in a pupil position of the objective 110.

The microscope 200 further includes a mirror 206, a confocal lens 207, a confocal diaphragm 208, a condenser lens 209, and a photodetector 210 on a detection light path (a transmitted light path of the dichroic mirror 203). A signal output from the photodetector 210 is output to an A/D converter 211.

The confocal lens 207 is a lens that condenses fluorescence on the confocal diaphragm 208. The confocal diaphragm 208 is a diaphragm arranged in a position optically conjugate to a focal plane of the objective 110. In the confocal diaphragm 208, a pinhole that passes through fluorescence generated in a focal position of the objective 110 is formed. The condenser lens 209 is a lens that guides fluorescence that has passed through the confocal diaphragm 208 to the photodetector 210.

The photodetector 210 is, for example, a photomultiplier tube (PMT), and outputs an analog signal that corresponds to a light quantity of incident fluorescence. The A/D converter 211 converts the analog signal from the photodetector 210 into a digital signal (a luminance signal), and outputs the digital signal to a computing device 20.

In the microscope system according to this embodiment with the configuration above, the microscope 200 uses the scanning unit 204 to scan the sample S with a laser beam, and detects fluorescence from respective positions of the sample S by using the photodetector 210. Then, the computing device 20 generates image data on the basis of a digital signal (a luminance signal) into which a signal from the photodetector 210 has been converted and scanning information of the scanning unit 204. Namely, in the microscope system according to this embodiment, a microscope apparatus that is configured of the microscope 200 and the computing device 20 obtains image data of the sample S.

In the microscope system according to this embodiment, the function calculation process illustrated in FIG. 4 can be performed, similarly to in the microscope system 1 according to Embodiment 1. Therefore, a function for correcting a spherical aberration within a region of interest with a high accuracy can be easily calculated.

Third Embodiment

FIG. 31 illustrates a configuration of a microscope 300 according to this embodiment. A microscope system according to this embodiment is different from the microscope system 1 illustrated in FIG. 1 in that the microscope 300 is included instead of the microscope 100. In the other respects, the microscope system according to this embodiment is similar to the microscope system 1, and therefore the same components are denoted by the same reference numerals.

The microscope 300 is an ordinary fluorescence microscope, not a scanning fluorescence microscope. The microscope 300 is also referred to as a zoom microscope because the microscope 300 has a zoom function. A sample S is a biological sample such as the brain of a mouse. The microscope 300 includes a lamp house 301 incorporating a light source 302, a collector lens 303, a fluorescence cube 304, a zoom lens 305, and an objective 110 on an illumination light path, as illustrated in FIG. 31. The objective 110, a Z drive unit 109 that moves the objective 110 in the optical axis direction, and a correction collar 111 that is a correction device that moves a lens in the objective 110 so as to correct a spherical aberration are similar to those in the microscope 100 according to Embodiment 1.

Examples of the light source 302 include a LED light source and a high-output mercury lamp. An output of the light source 302 is controlled by a light source controller 11. The collector lens 303 collimates excitation light from the light source 302. The fluorescence cube 304 includes a dichroic mirror, an excitation filter, and an absorption filter, although these are not illustrated. The fluorescence cube 304 is a beam splitter that splits excitation light and detection light (fluorescence) from the sample S, and splits the excitation light and the fluorescence according to a wavelength.

The zoom lens 305 is configured in such a way that a distance between lenses configuring the zoom lens 305 are changed. A zoom controller 12 changes the distance between lenses by using a motor not illustrated or the like so as to change a zoom magnification. Namely, the zoom lens 305 is controlled by the zoom controller 12.

The microscope 300 further includes a tube lens 306 and an imaging device 307 on a detection light path (a transmitted light path of the fluorescence cube 304). The tube lens 306 condenses fluorescence incident via the objective 110 and the zoom lens 305 on the imaging device 307, and forms an optical image of the sample S. The imaging device 307 is, for example, a CCD camera, and captures an optical image of the sample S and generates image data of the sample S. The imaging device 307 outputs the generated image data to the computing device 20.

In the microscope system according to this embodiment, a microscope apparatus that is the microscope 300 obtains the image data of the sample S.

In the microscope system according to this embodiment, the function calculation process illustrated in FIG. 4 can be performed, similarly to the microscope system 1 according to Embodiment 1. Therefore, a function for correcting a spherical aberration within a region of interest with a high accuracy can be easily calculated.

The embodiments described above give specific examples in order to easily understand the invention, and the present invention is not limited to the embodiments described above. Various modifications or variations of the microscope system and the method for calculating a relationship between a Z-position and a target value can be made without departing from the present invention specified in the claims. A single embodiment may be formed by combining some features in the context of the respective embodiments explained in this description.

A configuration in which the Z-controller 13 controls the Z drive unit 109 so as to change the Z-position of the objective 110 has been described as an example, but the Z-controller 13 may change the Z-position of the objective 110 by moving a stage of a microscope in the optical axis direction.

The correction collar 111 has been described as an example of a correction device that corrects a spherical aberration that varies according to a depth of a surface to be observed, but an arbitrary correction device that can change an amount of spherical aberration generated on an optical path may be employed. The correction device may be a device using, for example, an LCOS (Liquid crystal on silicon (trademark)), a DFM (Deformable Mirror), or a liquid lens. When a generated amount of spherical aberration is large and the spherical aberration cannot be sufficiently corrected by using a single correction device, an amount of spherical aberration to be corrected may be allocated to a plurality of correction devices and a spherical aberration generated on a surface to be observed may be corrected.

When a pixel resolution is greater than an optical resolution, namely, when a pixel size calculated from the pixel resolution is greater than a distance between two points that can be optically identified, a generated spherical aberration may fail to be sufficiently affect image data. In such a case, in order to correctly reflect the generated spherical aberration to not only the image data but also an evaluation value, the target value calculation process may be performed with a higher zoom magnification in such a way that the pixel resolution is less than the optical resolution. This allows a setting value for correcting a spherical aberration generated on a surface to be observed with a higher accuracy to be calculated.

As a method for calculating an evaluation value, an example in which a single piece of image data is obtained with each setting value and an evaluation value is calculated for each of the obtained pieces of image data has been described, but plural pieces of image data may be obtained with each setting value and an evaluation value may be calculated from the plural pieces of image data by using a Kalman filter or the like. In such a method, noise components included in respective pieces of image data can be cancelled by using the plural pieces of image data for each of the setting values, and therefore an evaluation value with a higher accuracy can be calculated.

In the target value calculation processes illustrated in FIGS. 21 and 25 in addition to the target value calculation processes illustrated in FIGS. 18 and 23, the entire region of image data may be divided into a plurality of regions and an evaluation value and a target value may be calculated for each of the regions. By doing this, a setting value for correcting a spherical aberration can be calculated more correctly.

In addition, when a biological sample such as the brain of a mouse is observed, cell bodies that emit light brightly may be scattered in a surface to be observed. Brightness of the cell bodies greatly varies due to the influence of a focus deviation, compared with the influence of a spherical aberration. Therefore, when an objective for which a focal length varies according to a setting value of the correction collar 111 is employed, it may be difficult to appropriately calculate a setting value for correcting a spherical aberration from an evaluation value (a contrast of an image). In such a case, as a method for calculating the evaluation value, the method illustrated in FIG. 32 for calculating the evaluation value after processing image data may be employed.

Figure 32:
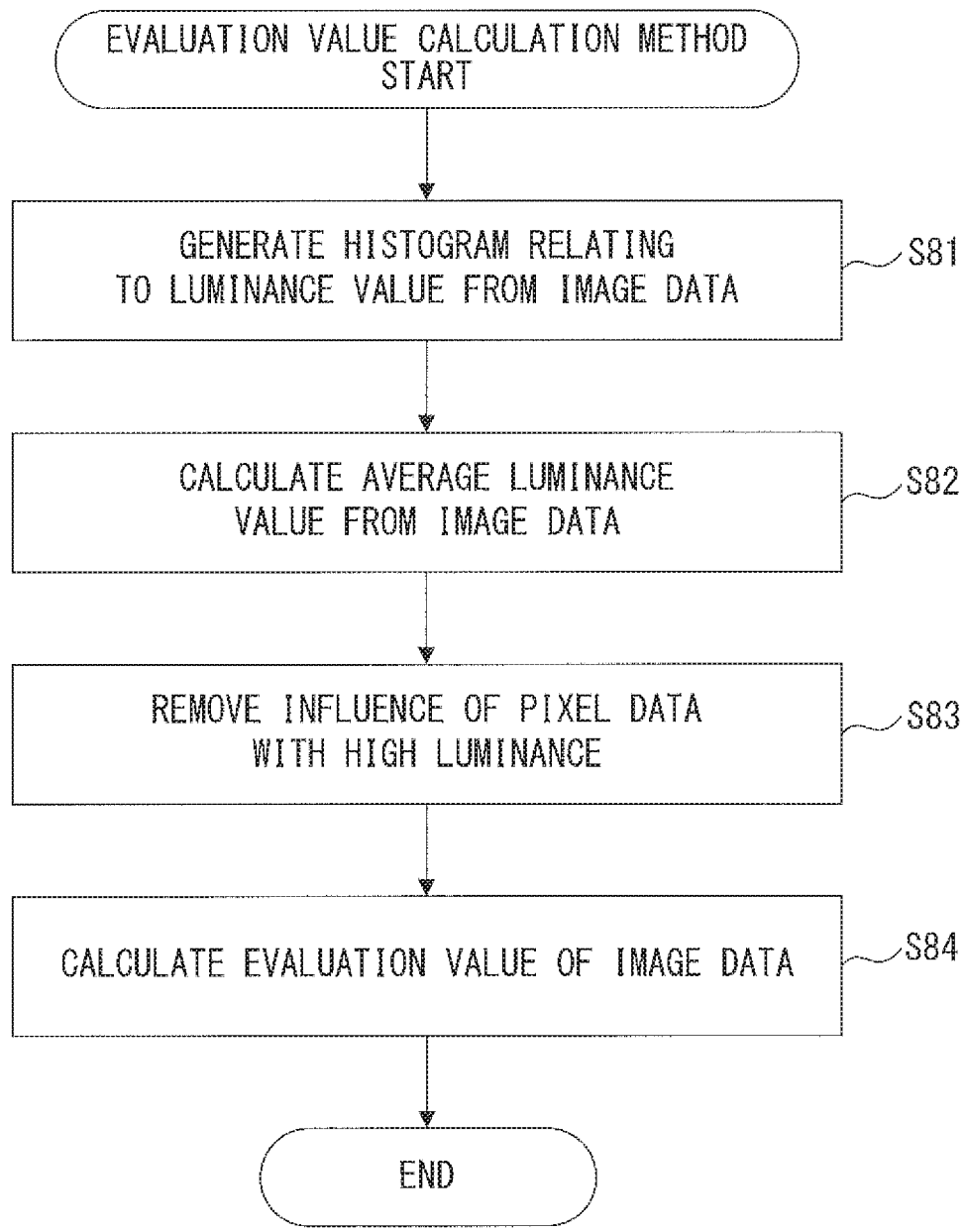
FIG. 32 is a flowchart of a process of calculating an evaluation value after processing of image data.

FIG. 32 is a flowchart of a process of calculating an evaluation value after processing of image data. With reference to FIG. 32, an evaluation value calculation process is described below.

A microscope system first generates a histogram relating to a luminance value from image data (step S81). Here, the computing device 20 specifies a luminance value of each pixel that configures the image data, calculates the number of pixels for each of the luminance values, and generates a histogram relating to the luminance value. The histogram is generated in order for a user of a microscope to visually understand a frequency distribution of the luminance value. Accordingly, in the evaluation value calculation process, generation of the histogram may be omitted.

Then, the microscope system calculates an average luminance value from the image data (step S82). Here, the computing device 20 divides the sum of luminance values of a plurality of pixels configuring the image data by the number of pixels so as to calculate the average luminance value.

The microscope system further removes the influence of pixel data with a high luminance (step S83). Here, the computing device 20 specifies pieces of pixel data with a luminance that is greater than, for example, an average luminance value+3σ (σ is a standard deviation of luminance values of pixels that configure the image data) by using the histogram generated in step S81 and the average luminance value calculated in step S82. The computing device 20 further changes luminance values of the pieces of pixel data to a prescribed luminance value so as to update the image data. The prescribed luminance value is, for example, the average luminance value+3σ.

Finally, the microscope system calculates an evaluation value of the image data on the basis of the image data updated in step S83 (step S84). A method for calculating an evaluation value in this step is similar to the method above.

By the microscope system performing the process illustrated in FIG. 32, the influence of, for example, cells emitting light brightly in a surface to be observed can be removed. Therefore, a setting value for correcting a spherical aberration can be correctly calculated. A method for processing image data is not limited to the method above. As an example, a region to be evaluated in an image may be specified in a displayed image, and an evaluation value may be calculated on the basis of pixel data within the region. Also in this case, a setting value for correcting a spherical aberration can be correctly calculated by specifying a region so as to not include cells emitting light brightly.

What is claimed is:

1. A microscope system comprising:
   a microscope apparatus comprising:
      an objective; and
      a correction device that corrects a spherical aberration; and
   a computing device comprising a hardware processor that operates under control of a stored program, the computing device being configured to:
      generate, based on an output from the microscope apparatus, image data of a surface to be observed of a sample in each of a plurality of states having different setting values of the correction device, so as to obtain plural pieces of image data; and
      calculate an evaluation value of the image data based on each of the plural pieces of image data so as to calculate evaluation values of the plural pieces of image data, the evaluation value being larger as the spherical aberration is corrected more satisfactorily,
   wherein the computing device performs control to repeat, for each of a plurality of Z-positions of the objective, a process of obtaining the plural pieces of image data in such a way that (i) a distribution range and an average interval of the setting values of the correction device are narrowed in each repetition, the setting values being set in the plurality of states, and (ii) a setting value of the correction device that corresponds to a maximum evaluation value calculated by the computing device is included within the distribution range, and
   wherein the computing device calculates, for each of the plurality of Z-positions, a target value based on the evaluation values calculated by the computing device and the setting values that correspond to the evaluation values, the target value being the setting value of the correction device for correcting the spherical aberration on the surface to be observed.

2. The microscope system according to claim 1, wherein the plurality of Z-positions are different from each other by a distance that is shorter than a movement amount of the surface to be observed, the movement amount being generated due to a change in the setting value of the correction device; and
   wherein the computing device is configured to calculate a combination of the setting value of the correction device and the Z-position based on the target values in the plurality of Z-positions and the evaluation values that correspond to the target values, the combination being estimated to make the evaluation value be maximum when the image data is obtained.

3. The microscope system according to claim 2, wherein the computing device is configured to determine, for each of the plurality of Z-positions, the setting values of the correction device, the setting values being set in the plurality of states.

4. The microscope system according to claim 1, wherein the computing device is configured to:
calculate the evaluation value of the image data in each of regions into which an entire region of the image data is divided, and calculate the target value in each of the regions; and
calculate one target value from the target values calculated in the respective regions.

5. The microscope system according to claim 1, further comprising:
a correction device controller that changes the setting value of the correction device to the target value calculated by the computing device; and
a laser controller that controls a power of a laser beam applied to the sample based on the image data generated in a state in which the setting value of the correction device is the target value.

6. The microscope system according to claim 1, wherein the correction device comprises a correction collar that moves a lens in the objective.

7. The microscope system according to claim 1, further comprising:
a storage that stores tendency information of the target value for each of the plurality of Z-positions,
wherein the computing device is configured to determine the distribution range based on the tendency information stored in the storage for each of the plurality of Z-positions.

8. The microscope system according to claim 7, wherein the tendency information comprises information regarding a recommended distribution range that is set for each of plural objectives based on a design value thereof, the recommended distribution range being a range of the setting value to be searched in order to calculate the target value.

9. The microscope system according to claim 7, wherein the tendency information comprises information obtained in advance relating to the setting value of the correction device and the evaluation value in a respective Z-position of the objective.

10. The microscope system according to claim 1, wherein, when a combination of the evaluation value calculated by the computing device and the setting value of the correction device that corresponds to the evaluation value is defined to be first coordinate information, the computing device calculates, for each of the plurality of Z-positions, a function using interpolation or function approximation based on the first coordinate information of at least three pieces of image data selected from the plural pieces of image data, the at least three pieces of image data including the image data for which a maximum evaluation value of the evaluation values is calculated, and calculates, for each of the plurality of Z-positions, the target value from the calculated function.

11. A microscope system comprising:
a microscope apparatus comprising:
an objective; and
a correction device that corrects a spherical aberration; and a computing device comprising a hardware processor that operates under control of a stored program, the computing device being configured to:
generate, based on an output from the microscope apparatus, image data of a surface to be observed of a sample in each of a plurality of states having different setting values of the correction device, so as to obtain plural pieces of image data; and
calculate an evaluation value of the image data based on each of the plural pieces of image data so as to calculate evaluation values of the plural pieces of image data, the evaluation value being larger as the spherical aberration is corrected more satisfactorily,
wherein, when a combination of the evaluation value calculated by the computing device and the setting value of the correction device that corresponds to the evaluation value is defined to be first coordinate information, the computing device calculates, for each of a plurality of Z-positions of the objective, a function using interpolation or function approximation based on first coordinate information of at least three pieces of image data selected from the plural pieces of image data, the at least three pieces of image data including the image data for which a maximum evaluation value of the evaluation values is calculated, and calculates, for each of the plurality of Z-positions, a target value from the calculated function, the target value being the setting value of the correction device for correcting the spherical aberration on the surface to be observed.

12. The microscope system according to claim 11, wherein the plurality of Z-positions are different from each other by a distance that is shorter than a movement amount of the surface to be observed, the movement amount being generated due to a change in the setting value of the correction device; and
wherein the computing device is configured to calculate a combination of the setting value of the correction device and the Z-position based on the target values in the plurality of Z-positions and the evaluation values that correspond to the target values, the combination being estimated to make the evaluation value be maximum when the image data is obtained.

13. The microscope system according to claim 12, wherein the computing device is configured to determine, for each of the plurality of Z-positions, the setting values of the correction device, the setting values being set in the plurality of states.

14. The microscope system according to claim 11, wherein the computing device is configured to:
calculate the evaluation value of the image data in each of regions into which an entire region of the image data is divided, and calculate the target value in each of the regions; and
calculate one target value from the target values calculated in the respective regions.

15. The microscope system according to claim 11, further comprising:
a correction device controller that changes the setting value of the correction device to the target value calculated by the computing device; and
a laser controller that controls a power of a laser beam applied to the sample based on the image data generated in a state in which the setting value of the correction device is the target value.

16. The microscope system according to claim 11, wherein the correction device comprises a correction collar that moves a lens in the objective.

17. A setting value calculation method for a microscope system, the method comprising:
- generating, by a computing device, based on an output from a microscope apparatus including an objective and a correction device that corrects a spherical aberration, image data of a surface to be observed of a sample in each of a plurality of states having different setting values of the correction device, so as to obtain plural pieces of image data;
- calculating, by the computing device, an evaluation value of the image data based on each of the plural pieces of image data so as to calculate the evaluation values of the plural pieces of image data, the evaluation value being larger as the spherical aberration is corrected more satisfactorily;
- repeating, under control of the computing device, for each of a plurality of Z-positions of the objective, the obtaining of the plural pieces of image data in such a way that (i) a distribution range and an average interval of the setting values of the correction device are narrowed in each repetition, the setting values being set in the plurality of states, and (ii) the setting value of the correction device that corresponds to a maximum evaluation value calculated by the computing device is included within the distribution range; and
- calculating, by the computing device, for each of the plurality of Z-positions, a target value based on the evaluation values calculated by the computing device and the setting values that correspond to the evaluation values, the target value being the setting value of the correction device for correcting the spherical aberration in the surface to be observed.

* * * * *